United States Patent [19]
Hase et al.

[11] Patent Number: 5,815,911
[45] Date of Patent: Oct. 6, 1998

[54] APPARATUS FOR ASSEMBLING PHOTO FILM CASSETTE

[75] Inventors: Akihiko Hase; Akira Wakabayashi; Takayuki Kambara; Makoto Shimizu; Haruo Ichikawa, all of Kanagawa, Japan

[73] Assignee: Fuji Photo Film Co., Ltd., Kanagawa, Japan

[21] Appl. No.: 829,341

[22] Filed: Mar. 31, 1997

Related U.S. Application Data

[62] Division of Ser. No. 447,605, May 23, 1995, Pat. No. 5,647,113.

[30] Foreign Application Priority Data

May 30, 1994 [JP] Japan .................................. 6-117221
May 24, 1994 [JP] Japan .................................. 6-109719

[51] Int. Cl.⁶ .................................................. B23P 21/00
[52] U.S. Cl. .............................. 29/705; 29/714; 29/806; 242/348.3; 53/118
[58] Field of Search ........................ 29/806, 434, 407.01, 29/407.05, 407.09, 407.1, 705, 714; 242/348, 348.1, 348.3, 348.4, 332.4, 333.5, 334.5, 413.2, 531.1, 532.6, 533.2, 533.4, 534.2, 538.4; 53/430, 118, 119, 520

[56] References Cited

U.S. PATENT DOCUMENTS

| | | |
|---|---|---|
| 4,574,563 | 3/1986 | Shimizu . |
| 4,834,306 | 5/1989 | Robertson et al. . |
| 4,846,418 | 7/1989 | Fairman . |
| 5,083,155 | 1/1992 | Kataoka et al. . |
| 5,271,577 | 12/1993 | Takahashi et al. . |
| 5,439,186 | 8/1995 | Merle et al. . |

FOREIGN PATENT DOCUMENTS

| | | |
|---|---|---|
| 0579228 | 1/1994 | European Pat. Off. . |
| 0584583 | 3/1994 | European Pat. Off. . |
| 0587447 | 3/1994 | European Pat. Off. . |
| 480161 | 3/1992 | Japan . |

*Primary Examiner*—David P. Bryant
*Attorney, Agent, or Firm*—Sughrue, Mion, Zinn, Macpeak & Seas, PLLC

[57] ABSTRACT

A cassette (110), to be loaded with a photo film strip, has a photo film passageway (119) through which a leader (123) of the photo film strip (23, 111) is drawn out of a cassette shell. On a spool (112) is retained a trailer (124) of the photo film strip. A loader apparatus has a light-tight dark compartment (147). A rotary barrel (163) is rotatable, and partially fitted in an opening formed in a downstream wall of the dark compartment. Two cassette holders (164, 165) are disposed on the barrel and in respective positions opposite about a rotational axis (163a) of the barrel, and hold the cassette removably. The barrel is rotated to move the cassette holders into and out of the dark compartment. The cassette is supplied to one of the cassette holders located outside the dark compartment. The trailer of the photo film strip is passed into the photo film passageway in the cassette in one of the cassette holders located inside the dark compartment. The trailer is retained on the spool as passed into the photo film passageway. The spool of the cassette is rotated in the dark compartment after retaining the trailer, for winding the photo film strip on the spool, to include the photo film strip into the cassette.

27 Claims, 30 Drawing Sheets

F I G. 19
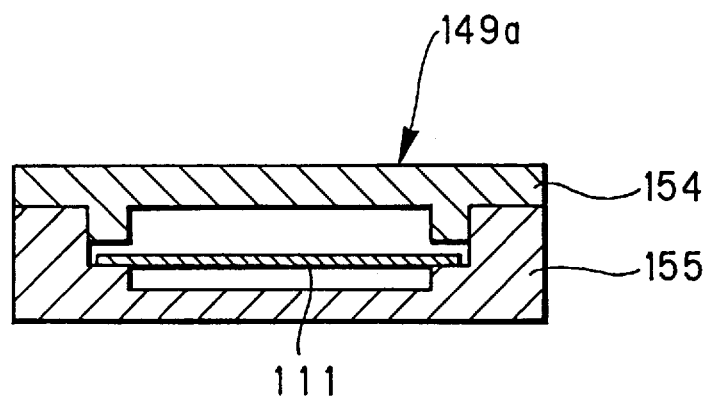
F I G. 20
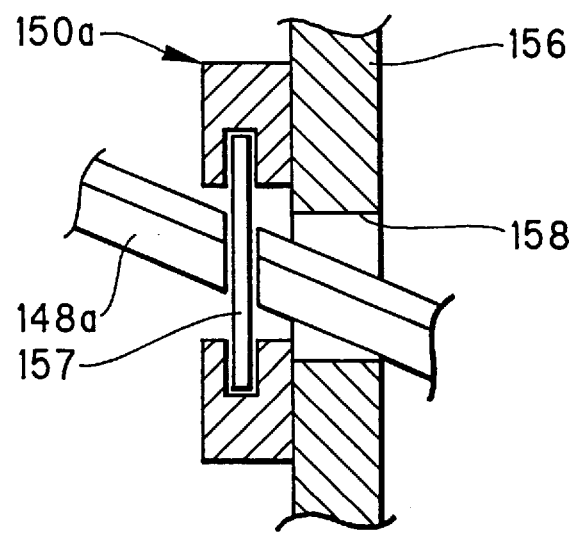

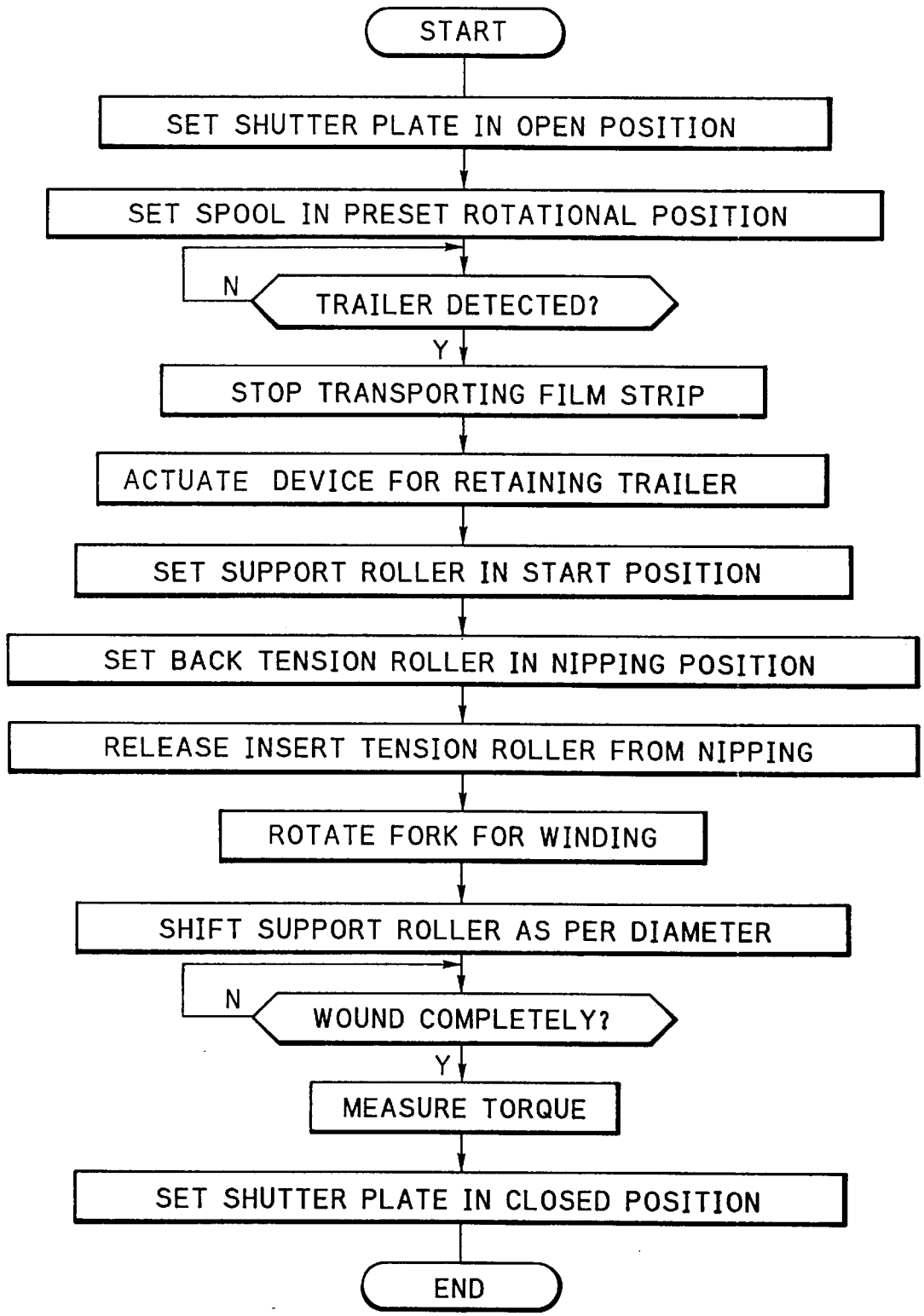

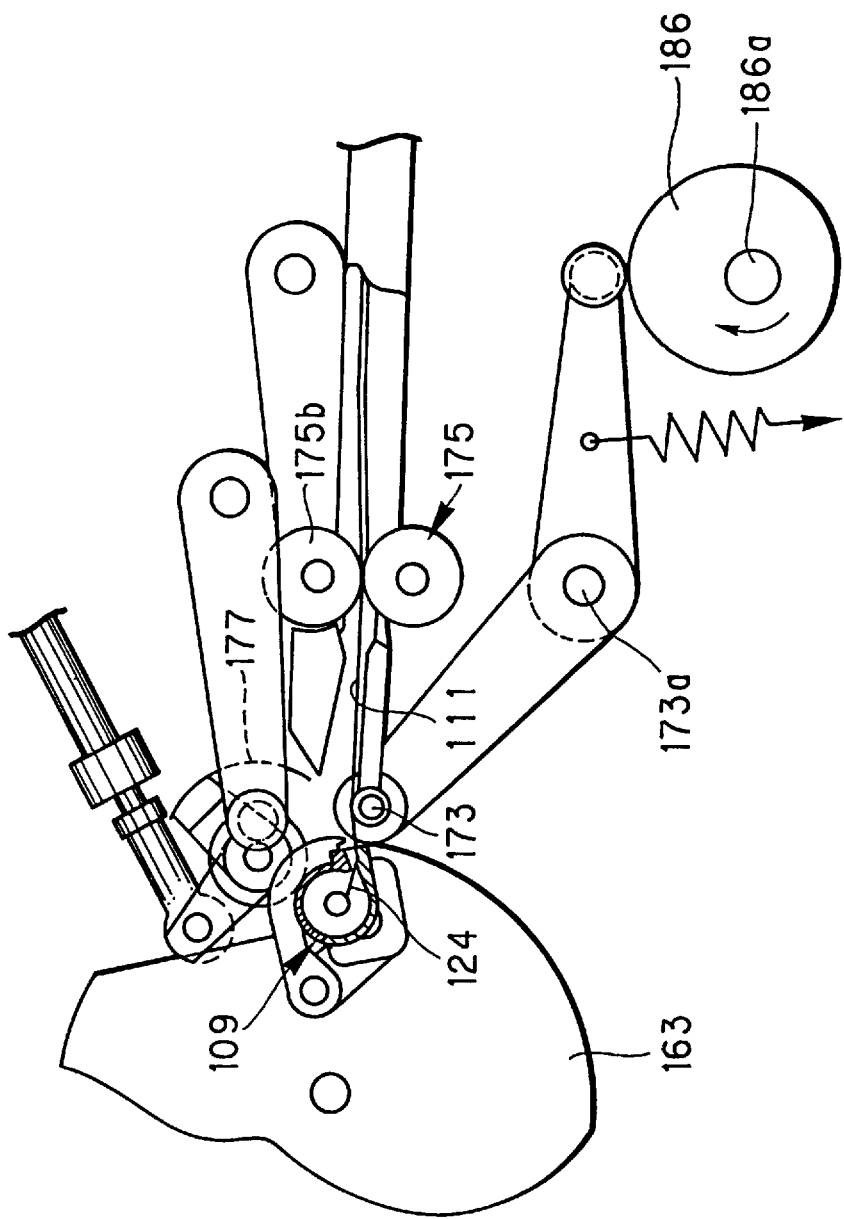

F I G. 35
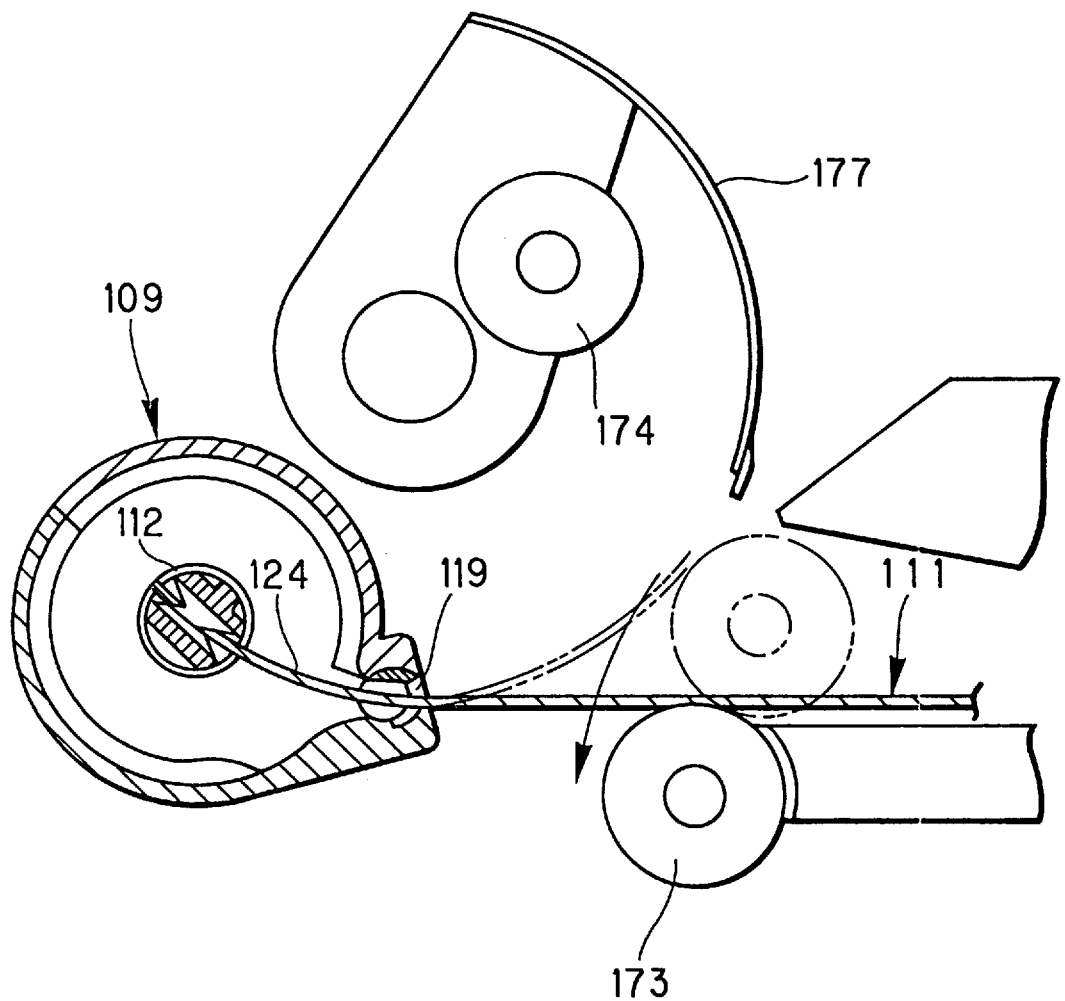

APPARATUS FOR ASSEMBLING PHOTO FILM CASSETTE

This is a divisional of application Ser. No. 08/447,605, filed May 23, 1995 now U.S. Pat. No. 5,647,113.

BACKGROUND OF THE INVENTION

1. Field of the Invention

The present invention relates to a method and an apparatus for assembling a photo film cassette. More particularly, the present invention relates-to a method and an apparatus for assembling a photo film cassette with increased productivity.

2. Description of the Related Art

There is a known photo film cassette as disclosed in U.S. Pat. Nos. 4,834,306 and 4,846,418 and a commonly assigned U.S. Pat. No. 5,271,577 (corresponding to JP-A 3-37645), in which a cassette shell is molded from resin, and in which rotation of a spool causes a leader of a photo film strip to advance to an outside of the cassette shell (hereinafter referred to as leader-advancing cassette). Unlike the most available, earlier type of photo film cassette, the leader of the leader-advancing cassette is fully in the cassette both before and after exposure of the photo film strip. It is thus possible to increase the light-tightness of the cassette for protection of the photo film strip, and to facilitate handling of the cassette.

There is a commonly assigned co-pending U.S. patent application Ser. No. 08/091,626 (corresponding to EP 0 582 852 A1, and JP-A 6-35123) disclosing a cassette assembling apparatus. Cassettes with a spool are prepared in a bright room, and set in the assembling apparatus one after another. A guide plate of a tongue shape is inserted into a film passageway of the cassette. A trailer of a photo film strip is slid in contact with the guide plate, inserted into the cassette, and retained on the spool. Then the spool is rotated to wind the photo film into the cassette.

In this assembling apparatus, only one cassette can be set at one time. This is unsuitable for mass production of photo film cassettes.

There is a known system for producing a photo film cassette: a photo film is cut to have a predetermined length and is wound on a spool, and loaded with a photo film cassette. The cassette producing system includes a cutting apparatus and a loader apparatus. The cutting apparatus produces the photo film strip at the length associated with the available maximum number of frames. The loader apparatus retains the photo film strip on the spool, and rotates the spool for the loading of the photo film strip. There is a prior document JP-A 4-80161 disclosing delivery of photo film strips toward a number of loader apparatuses: one cutting apparatus is followed by the plural loader apparatuses, and associated with a delivering mechanism, through which the photo film strips are delivered for positions of the receipt at the loader apparatuses, to make effective use of performance of the cutting apparatus and with suitability to a supply speed of photo film strips.

In such manufacturing systems, photo film strips are delivered by a changeover gate toward two loader apparatuses for loading the cassette with the photo film strips. One of the loader apparatuses winds a photo film strip around a spool, while the other loader apparatus receives another photo film strip to stand by for the loading to increase efficiency in manufacturing photo film cassettes.

In this cassette producing system, there is a considerable distance between the changeover gate and an entrance of a transport path of the loader apparatuses. The photo film strip passing the section having this distance is not sufficiently regulated in orientation and position. There is a problem in that a curling tendency of the photo film strip may hinder the photo film strip from being received by any of the transport paths of the loader apparatus. It is also likely that a photo film strip may be accidentally bent due to a delivering angle during conveyance. Friction to the photo film strip during the conveyance may create scratches on it.

To drive a gate for changing over, it can be conceived to use an air cylinder or cam, with which, however, it is impossible at high speed to deliver photo film strips toward positions as desired. The Low speed of such conventional drive structures for changing over results in low efficiency in manufacturing photo film cassettes. Only limited positions for receiving the delivery can be determined when the air cylinder or cam is used. It is extremely difficult to increase the number of the loader apparatuses to be set up, in other words, the number of the positions for receiving delivery. These obstacles reduce the productivity of manufactoring photo film cassettes.

SUMMARY OF THE INVENTION

In view of the foregoing problems, an object of the present invention is to provide a method and apparatus for assembling a photo film cassette with high efficiency.

Another object of the present invention is to provide a method and apparatus for delivering photo film strips at a high speed, in positions as desired for plural loading stations, and damage.

In order to achieve the above and other objects and advantages of this invention, a photo film loader apparatus for loading a cassette with a photo film strip comprises a light-tight dark compartment. A rotary barrel device is disposed in rotatable fashion and partially fitted in an opening formed in a downstream wall of the dark compartment. A plurality of cassette holders are disposed on the barrel device in respective positions opposite with reference to a rotational axis of the barrel device, for holding the cassette removably, the barrel device is rotated to move the cassette holders into and out of the dark compartment. A cassette supply device is disposed outside the dark compartment, for supplying the cassette to one of the cassette holders located outside the dark compartment. A photo film retaining device is disposed inside the dark compartment, for accessing the cassette at one of the cassette holders located inside the dark compartment, in order to pass the trailer of the photo film strip into the photo film passageway in the cassette, and to retain the trailer on the spool. A spool rotating device. is disposed in the dark compartment, for rotating the spool of the cassette, and is driven after the photo film retaining device finishes the retention, for winding the photo film strip on the spool with the trailer retained. The cassette with the photo film strip wound therein is removed from the cassette holder when moved out of the dark compartment by rotation of the barrel device.

There are a plurality of the barrel devices. The photo film strips are transported one after another. A plurality of transport paths guides the photo film strip respectively to the plurality of the barrel devices, the transport paths having entry slots disposed radially. A rotary disk is disposed between the supply path and the transport paths and is rotatable about a central axis, the central axis being perpendicular to a longitudinal direction of the photo film strip and parallel to a plane of the photo film strip. A stationary guide plate is disposed between the supply path and the central axis of the rotary disk, and a first path is formed in the guide plate at a size associated with a thickness of the photo film strip, for guiding the photo film strip from the supply path toward the central axis of the rotary disk. A delivery guide device is mounted on the rotary disk, positioned between the central axis of the rotary disk and the transport paths and a second path is formed in the delivering guide device at a size associated with a thickness of the photo film strip, for receiving the photo film strip from the stationary guide plate in a vicinity of the central axis, to guide the photo film strip in a radial direction of the rotary disk. A motor rotates the rotary disk, and the rotary disk is stopped sequentially to direct an exit slot of the delivery guide device toward the entry slots of the transport paths so that the photo film strip is transported through the delivery guide device into a selected one of the transport paths.

Further, a cutter device is disposed upstream from the barrel device, for cutting a continuous photo film into the photo film strips of a regular length. A light-shielding structure prevents ambient light from entering the dark compartment through the opening downstream therefrom, a part of the light-shielding structure provided on the barrel device. The photo film retaining device includes an insert plate for capturing the trailer of the photo film strip cut at a regular length. The insert plate is drawn out of the cassette after the insert plate passes the trailer through the photo film passageway and retains the trailer on the spool.

Furthermore, the first linear path device has a first path. The first path device is supplied with the photo film strip. A second linear path device has a second path. The second path device is connected downstream of the first path device at a sloping connecting portion, for guiding the photo film strip from the first path device toward the barrel device. A nipping roller is disposed at the sloping connecting portion, for conveying the photo film strip along the first and second path devices to the barrel device.

A shiftable roller is disposed in the dark compartment in rotatable and shiftable fashion, and contacted on the photo film strip directed to the photo film passageway of the cassette held in one of the cassette holders. A shifting device supports the shiftable roller, and is driven with the spool rotating device, for shifting the shiftable roller while the photo film strip is wound around the spool, to change a course of the photo film strip in accordance with a diameter of a roll of the photo film strip around the spool, for avoiding rubbing the photo film strip on the cassette shell.

The cassette has a structure for advancing the leader of the photo film strip to an outside of the photo film passageway when the spool is rotated in a direction of unwinding the photo film strip. After the photo film strip is wound in the cassette, the spool rotating device rotates the spool in the unwinding direction to protrude a small portion of the leader from the photo film passageway, and subsequently rotates the spool in a winding direction to include the leader in the cassette. A measuring device measures torque applied by the spool rotating device to the spool for rotation, while the spool rotating device protrudes the leader from the photo film passageway, and while the spool rotating device subsequently includes the leader in the cassette.

The cassette further includes an identifying information portion disposed on an outside the cassette shell and formed to represent identifying information of the cassette shell. An information reader for reading the identifying information of the cassette is disposed in the cassette holder. An information recorder is connected to the information reader, for imprinting an information image of a latent image form on the photo film strip in accordance with the identifying information from the information reader.

BRIEF DESCRIPTION OF THE DRAWINGS

The above objects and advantages of the present invention will become more apparent from the following detailed description when read in connection with the accompanying drawings, in which:

FIG. 19 is a cross section illustrating a transport path;

FIG. 20 is an explanatory view schematically illustrating a shutter mechanism;

FIG. 30 is a flow chart illustrating operation of the loader apparatus;

FIG. 34 is an explanatory view illustrating a start position of a support roller for the trailer;

FIG. 35 is an explanatory view illustrating the same in enlargement;

DETAILED DESCRIPTION OF THE PREFERRED EMBODIMENT(S) OF THE PRESENT INVENTION

Figure 1:
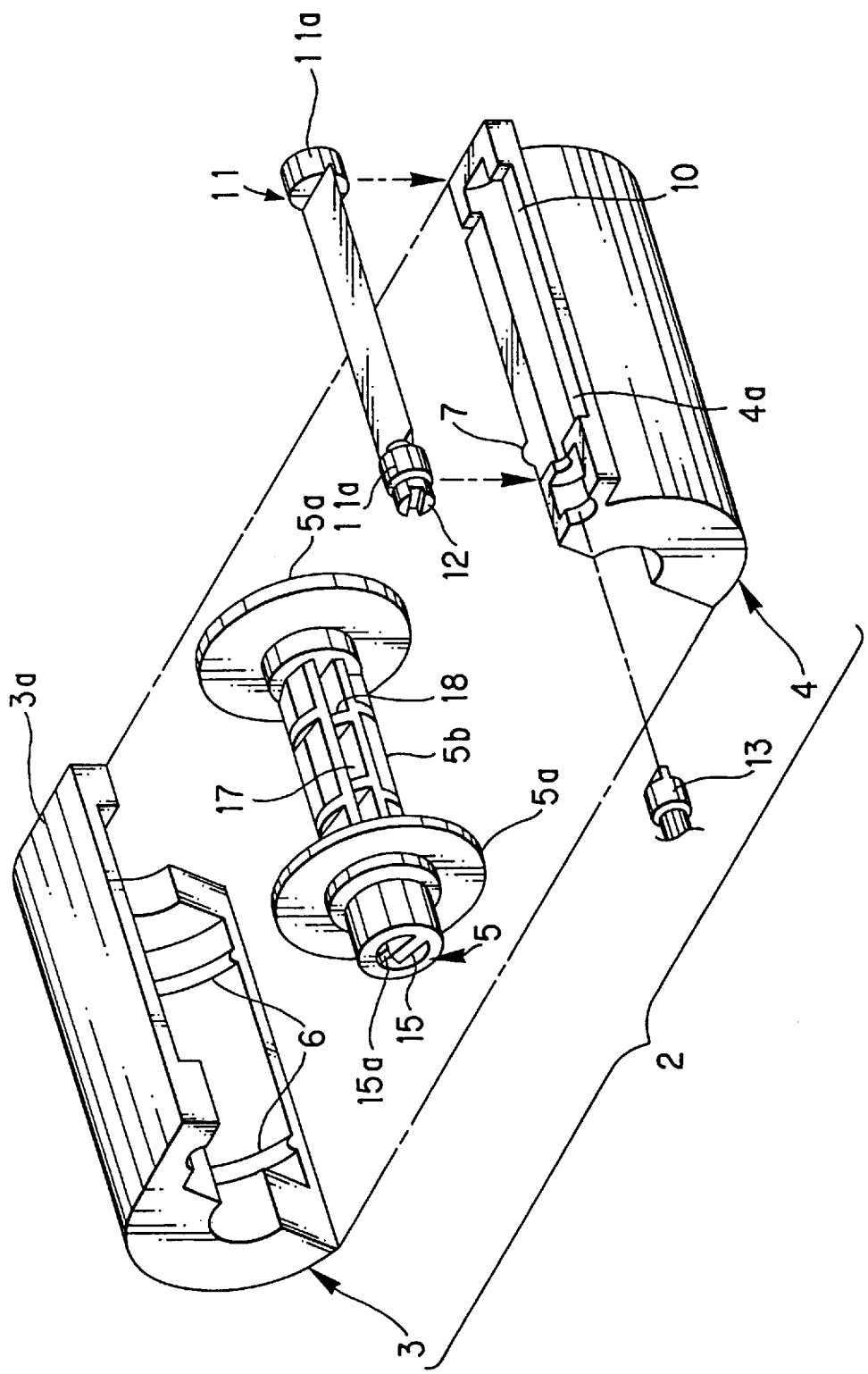
FIG. 1 is an exploded perspective view illustrating a photo film cassette.

FIG. 1 illustrates a photo film cassette to be assembled by an apparatus of a preferred embodiment. A cassette shell 2 is constituted by an upper shell half 3, a lower shell half 4, and a spool 5, respectively molded as single pieces of plastics. Inner walls of the shell halves 3 and 4 have a pair of ridges 6. When a photo film strip 23 (See FIG. 4) is wound about the spool 5 and contained between the shell halves 3 and 4, the ridges 6 contact on periphery of the roll of the photo film strip 23 to prevent it from loosening around the spool 5. Accordingly, when the spool 5 is rotated in an unwinding direction, namely counterclockwise as viewed in the drawing, the roll of the photo film strip 23 is rotated with the spool. A reference numeral 7 designates a separator claw, which, during rotation of the photo film strip 23, abuts on a leading end of the photo film strip 23, and separates it from the roll, so as to guide a leader of the photo film strip 23 to an exterior of the cassette shell 2.

The shell halves 3 and 4 have tongue portions 3a and 4a, which, when the shell halves 3 and 4 are fitted together, the tongue portions 3a and 4a are joined to define a photo film passageway 10. A shutter plate 11 is incorporated between the tongue portions 3a and 4a. Ends of the shutter plate 11 have shaft portions 11a, which render the shutter plate 11 rotatable in parallel with the spool 5. One of the ends of the shutter plate 11 has a key 12, which appears externally through a surface of the cassette shell 2. When an opener member 13 is fitted on the key 12 and rotates it, the shutter plate 11 is rotationally changed between an open position where the photo film passageway 10 is open and a closed position where the photo film passageway 10 is closed.

The spool 5 has a pair of flanges 5a formed integrally therewith. The photo film strip 23 is wound on a core 5b of the spool 5 between the flanges 5a. Ends of the spool 5 appear through the faces of the cassette shell 2, and respectively have a key 15. The key 15 is adapted to engagement with a member in an apparatus for driving the spool 5 to be rotated. An end of the key 15 has a notch 15a.

Figure 2:
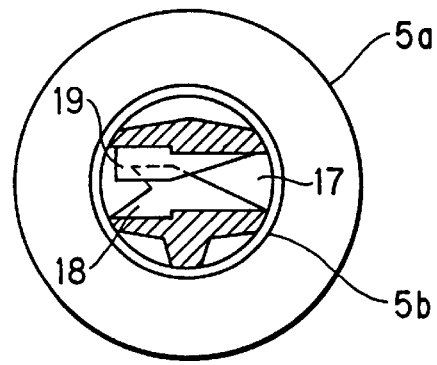
FIG. 2 is a cross section illustrating a core of a spool of the cassette.
Figure 3:
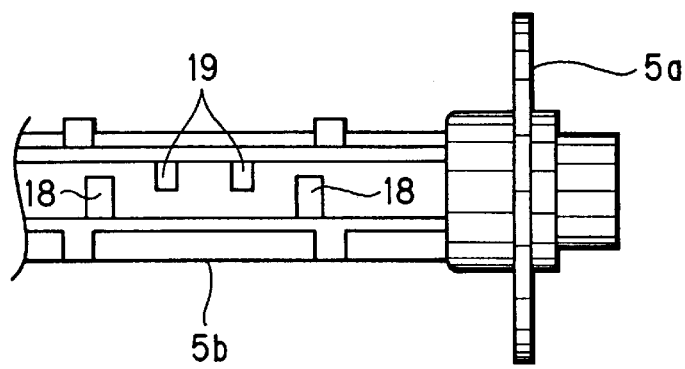
FIG. 3 is a front elevation illustrating the core of the spool.

A slot 17 is formed in the core 5b of the spool 5. The inside of the slot 17 has a pair of hooks 18 and a pair of ridges 19, as illustrated in FIGS. 2 and 3. The ridges 19 are projected downward between the hooks 18. The slot 17 has an entrance for insertion in the right as viewed in FIG. 2. A trailer 27 of the photo film strip 23 is inserted into the entrance.

Figure 4:
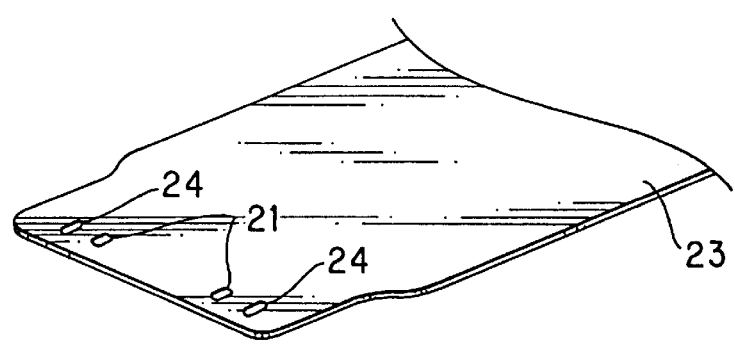
FIG. 4 is an explanatory view illustrating a trailer of a photo film strip.

In the trailer 27 of the photo film strip 23 are formed a pair of retaining holes 21 as illustrated in FIG. 4. The hooks 18 are engaged with the retaining holes 21. The ridges 19 prevent the trailer 27 of the photo film strip 23 from disengaging from the hooks 18. The photo film strip 23 is never disengaged accidentally from the slot 17 even when force to pull the photo film strip 23 is applied to the photo film strip 23. The trailer 27 of the photo film strip 23 also has a pair of holes 24. The holes 24 are utilized for insertion and attachment of the trailer 27 into the slot 17.

Figure 5:
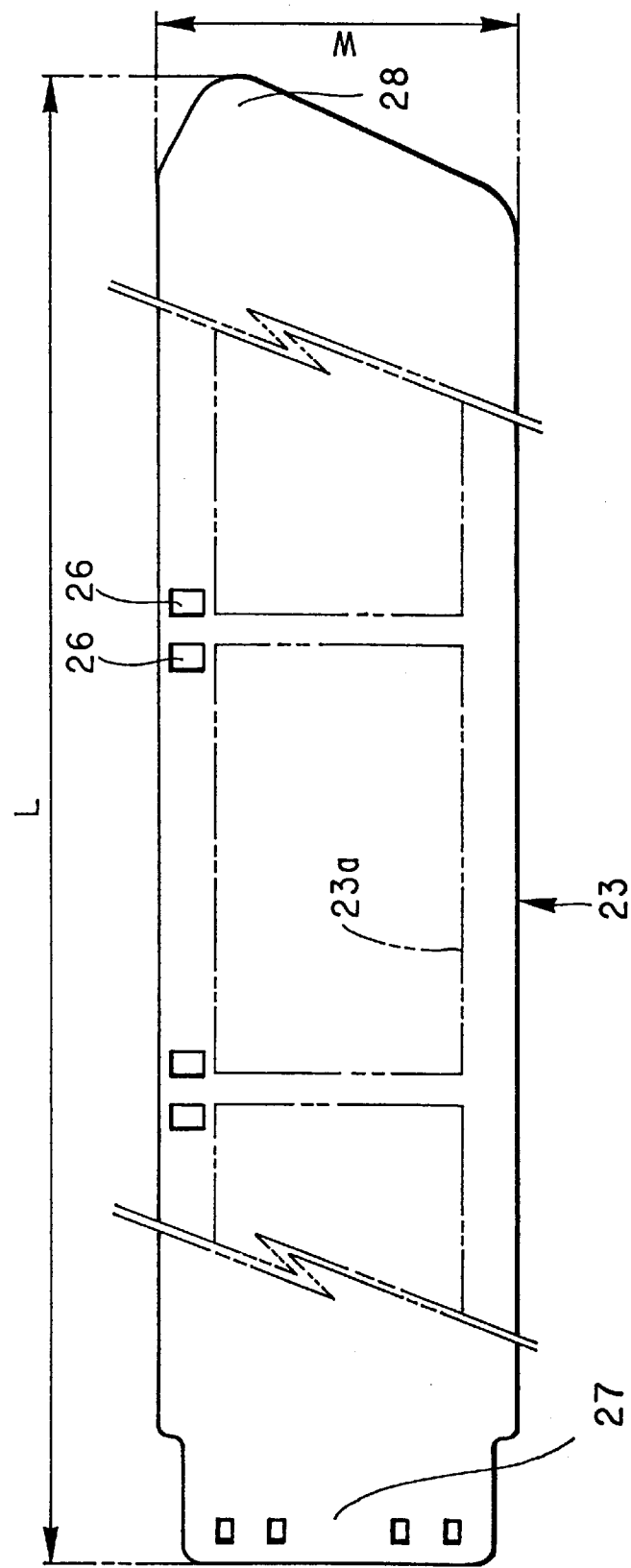
FIG. 5 is an explanatory view illustrating the photo film strip.

The photo film strip 23 to be contained in the cassette shell 2 has the length L from 500 to 1700 mm, as illustrated in FIG. 5. The length L depends on the available maximum number of exposures to be taken on the photo film strip 23. The width W of the photo film strip 23 is for example 25 mm. There are perforations 26 formed near one of the longitudinal edges of the photo film strip 23. Two of the perforations 26 are associated with one frame 23a. The perforations 26 are used for positioning the frame 23a on an exposure aperture in a camera. Distal ends of the photo film strip 23 define the trailer 27 and a leader 28. The leader 28 is separated by the separator claw 7 (See FIG. 1) when advancing to the exterior of the cassette shell 2.

The photo film strip 23 includes a support having thickness of 80 to 105 microns, and a coating of photosensitive emulsion layer applied to the support at thickness of 3 to 30 microns. The support is formed of polyethylene-2,6-naphthalate (PEN). The elasticity and the coefficients of static friction of the photo film strip 23 were experimentally measured: the modulus of elasticity in tension was 500 to 730 $kg/mm^2$; the static friction coefficient of an emulsion surface of the photo film strip 23 was 0.16; and the static friction coefficient of a back surface of the photo film strip 23 was 0.12.

Figure 6:
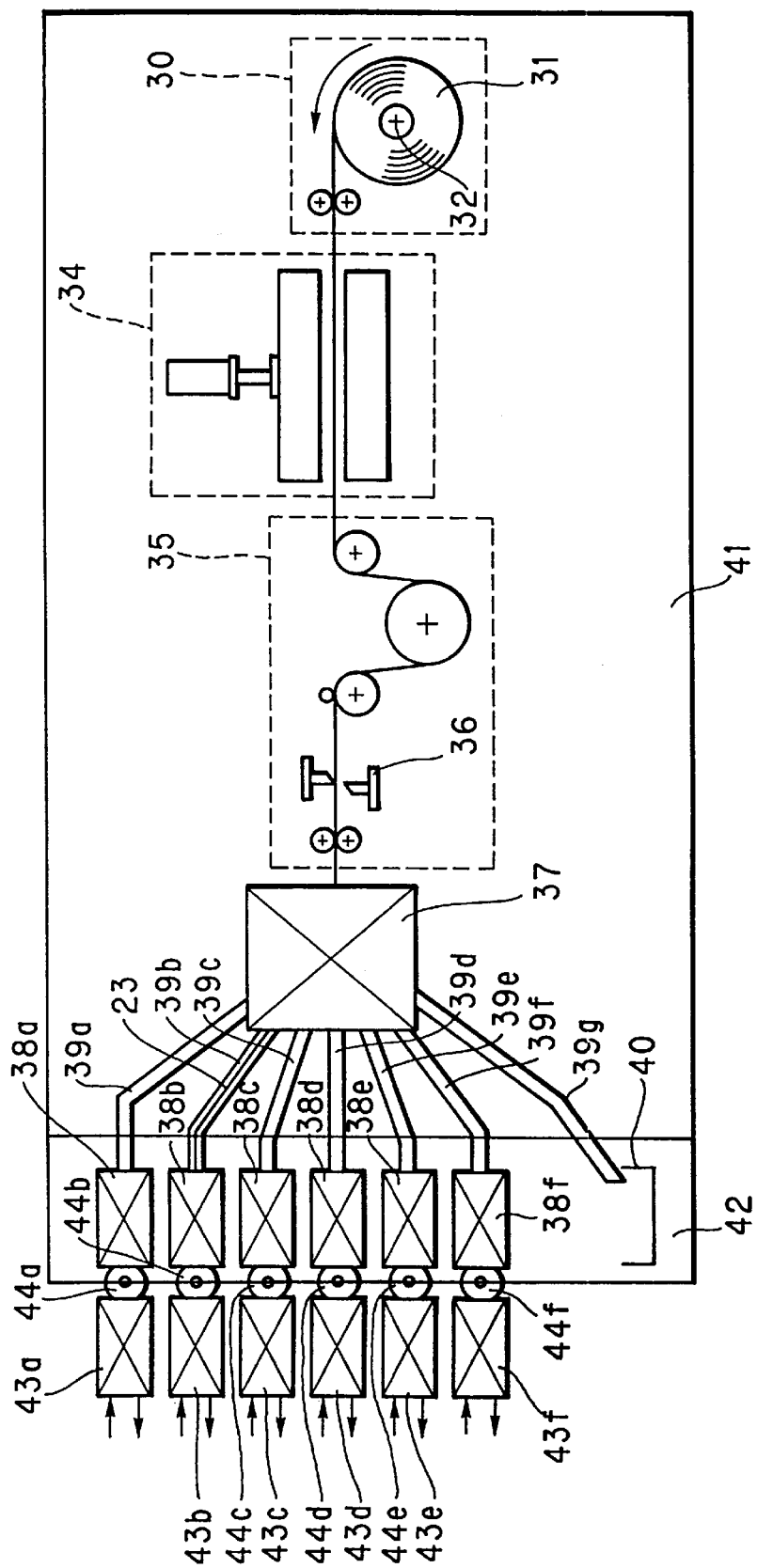
FIG. 6 is an explanatory view schematically illustrating a system for producing the,photo film cassette.

FIG. 6 illustrates a system for assembling the photo film cassette. A supply section 30 contains a continuous photo film 31 on a reel 32. The photo film 31 has the PEN support and the emulsion surface, and generally has thickness t of 150 microns. The photo film 31 is drawn from the reel 32 horizontally, and fed to a perforator section 34. The perforator section 34 forms the perforations 26. As illustrated in FIG. 5, two of the perforations 26 are associated with each one of the frames 23a with reference to a width direction of the photo film 31. The perforator section 34 can be of any appropiate type for adaptation to the maximum photographable numbers of frames of photo film strips: for example, the assembling system includes two perforator sections respectively to form perforations for ten frames, and one perforator section to form perforations for five frames.

The photo film 31 with the perforations 26 formed therein is conveyed to a cutting section 35, where the photo film 31 as conveyed is measured with a predetermined length, and cut by a cutter 36 into the photo film strip 23. Front and rear portions of the photo film strip 23 are formed into shapes of the leader 28 and the trailer 27 illustrated in FIG. 5. The retaining holes 21 and the holes 24 are formed in the trailer 27 at the same time.

The photo film strip 23 is moved with the trailer 27 directed ahead, entered in a delivery section 37, and is delivered to either of six loader sections 38a–38f. There are arranged seven transport paths 39a–39g radially between the delivery section 37 and the loaders 38a–38f. While the transport paths 39a–39f are respectively directed to the loaders 38a–38f, the transport path 39g is directed to a receptacle tray 40. The transport path 39g is used for transportation of unacceptable photo film strips, such as defective perforations or cut portions, to be exited to the receptacle tray 40. The supply section 30, the delivery section 37 and the transport paths 39a–39g are disposed in a photo film producing compartment 41 which is light-tight and which is separated from the loaders 38a–38f.

The loaders 38a–38f are arranged in a loading compartment 42 which is light-tight, and associated with a cassette supply/exit sections 43a–43f which can be arranged in a bright room. The supply/exit sections 43a–43f supply the cassette shell 2 as assembled to the loaders 38a–38f, and exit photo film cassettes toward a packaging station following the supply/exit sections 43a–43f. Between the supply/exit sections 43a–43f and the loaders 38a–38f, there are disposed transfer sections 44a–44f, which transfer the cassette shell 2 while keeping the loading compartment 42 light-tight.

The transfer sections 44a–44f transfer the cassette shell 2 from the supply/exit sections 43a–43f to the loaders 38a–38f. In the loaders 38a–38f, the shutter plate 11 of the cassette shell 2 in FIG. 1 is positioned rotationally in the open position. The photo film strip 23 from the transport paths 39a–39f is transported by transport rollers in the loaders 38a–38f, before the trailer 27 is engaged with the hooks 18 of the spool 5. With the spool 5 rotated, the photo film strip 23 is wound about the core 5b. When all the photo film strip 23 is wound, the shutter plate 11 is positioned in the closed position. The photo film cassette containing all of the photo film strip 23 is transferred from the loaders 38a–38f to the supply/exit sections 43a–43f, and conveyed to the packaging station.

The loaders 38a–38f are disposed in the loading compartment 42 separately from the photo film producing compartment 41, because it is more likely that the loaders 38a–38f will require maintenance than the other components of the assembling system. When the loader 38a has a failure for example, the delivery section 37 delivers the photo film strip 23 to the loaders 38b–38f other than the loader 38a. In the meantime the loader 38a can be repaired.

Figure 7:
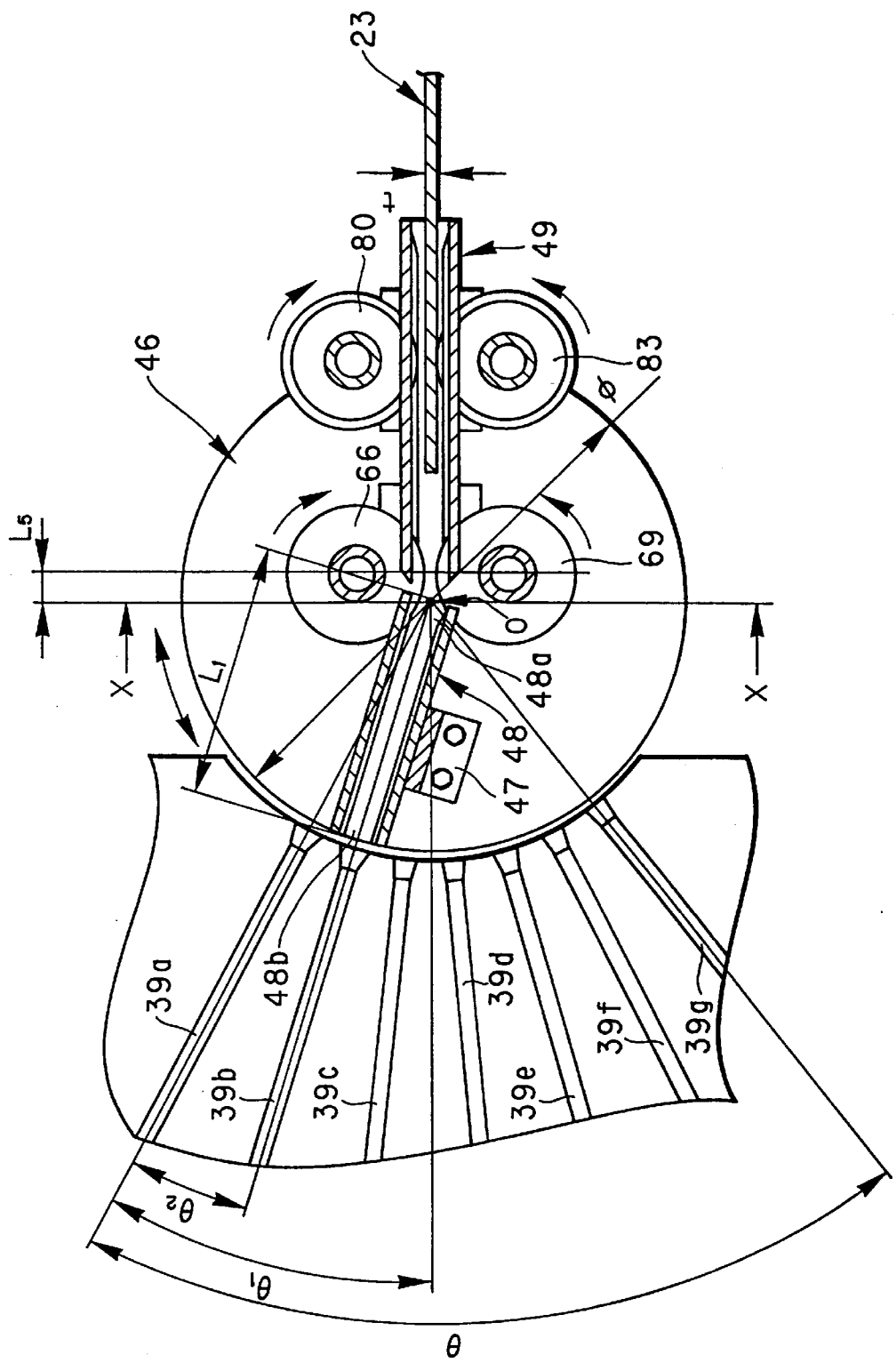
FIG. 7 is a cross section illustrating an apparatus for delivering the photo film strip.
Figure 8:
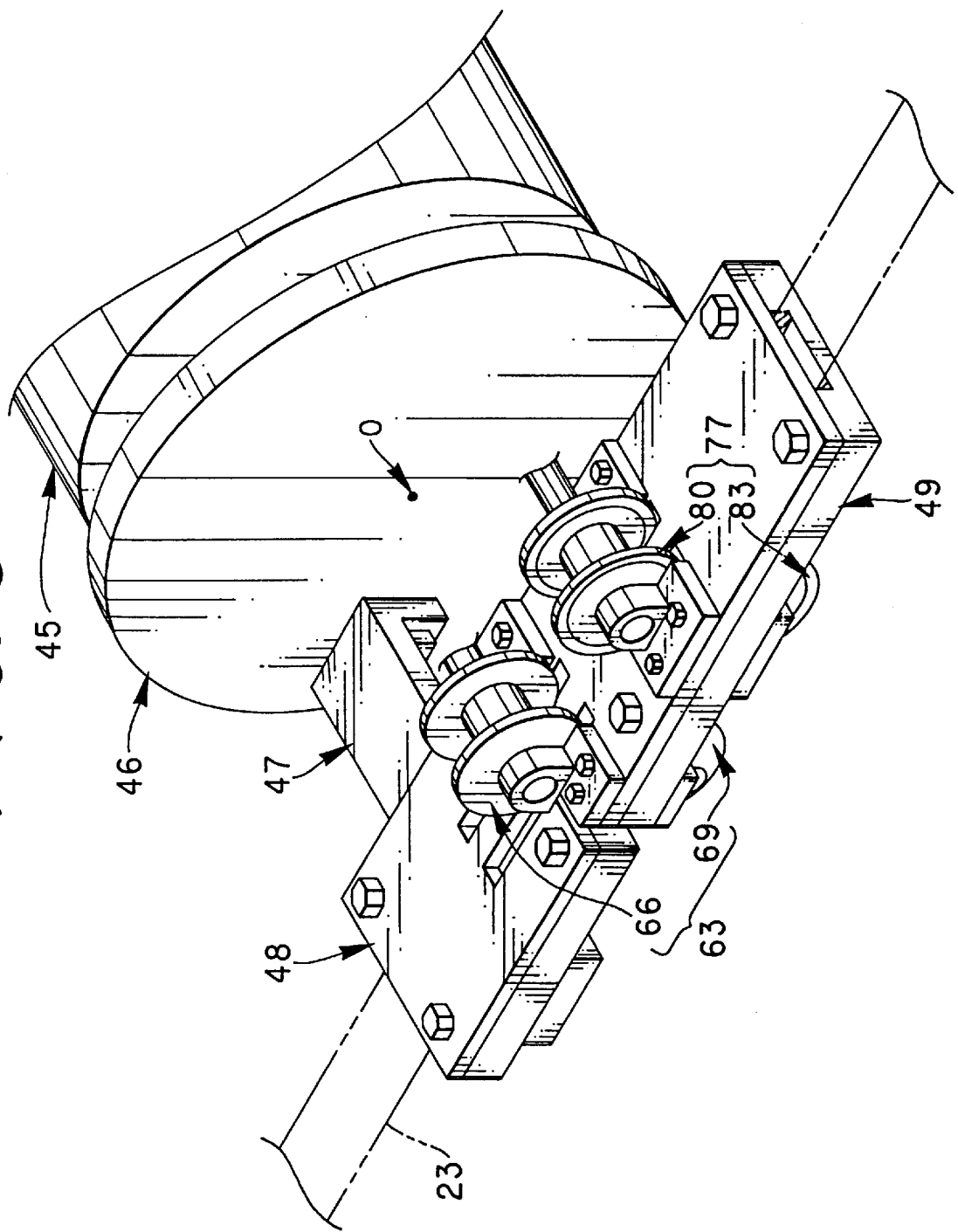
FIG. 8 is a perspective view illustrating the photo film delivering apparatus.

The delivery section 37 is described now in detail. As illustrated in FIGS. 7 and 8, the delivery section 37 includes a servo motor 45 as source of motion for the delivery. A rotational axis of the servo motor 45 is designated with the sign O, lies on the plane defined by the photo film strip 23, and extends perpendicular to the longitudinal direction of the photo film strip 23. A rotary disk 46 is mounted in rotatable fashion about the axis O and in forward and backward directions. A delivery guide device 48 is fixed on the disk 46 via a bracket 47, and has a receiving slot 48a for the photo film strip 23. A stationary guide device 49 is disposed upstream from the receiving slot 48a, and adapted to guidance for supply of the photo film strip 23 as formed by the cutting section 35.

The disk 46 has a diameter of 160 mm. The length L1 of the delivery guide device 48 is 75 mm, shorter than a radius of the disk 46. The stationary guide device 49 is located horizontally with respect to the axis O of the disk 46. Even when the disk 46 is rotated about the axis O, the receiving slot 48a is unmovably directed to the end of the stationary guide device 49. An exit slot 48b of the delivery guide device 48 is positioned at entry slots of the transport paths 39a–39g.

The delivering angle θ covered by the transport paths 39a–39g is 66 degrees about the axis O. The angle θ1 of the transport path 39a with reference to the stationary guide device 49 is 28 degrees. The angle θ2 between the transport paths 39a–39g is 11 degrees. The servo motor 45 is stopped in a rotational position while monitored by a known sensor or encoder for detecting its position. The servo motor 45 has a home position determined at the transport path 39a. The servo motor 45 generates rotation at as high a speed high enough to require at most 0.1 second between the transport path 39a and the transport path 39g, which define the longest rotational distance of the delivery guide device 48 to permit delivery of the photo film strip 23 to be very fast. The photo film cassette can thus be produced with a high efficiency.

Figure 9:
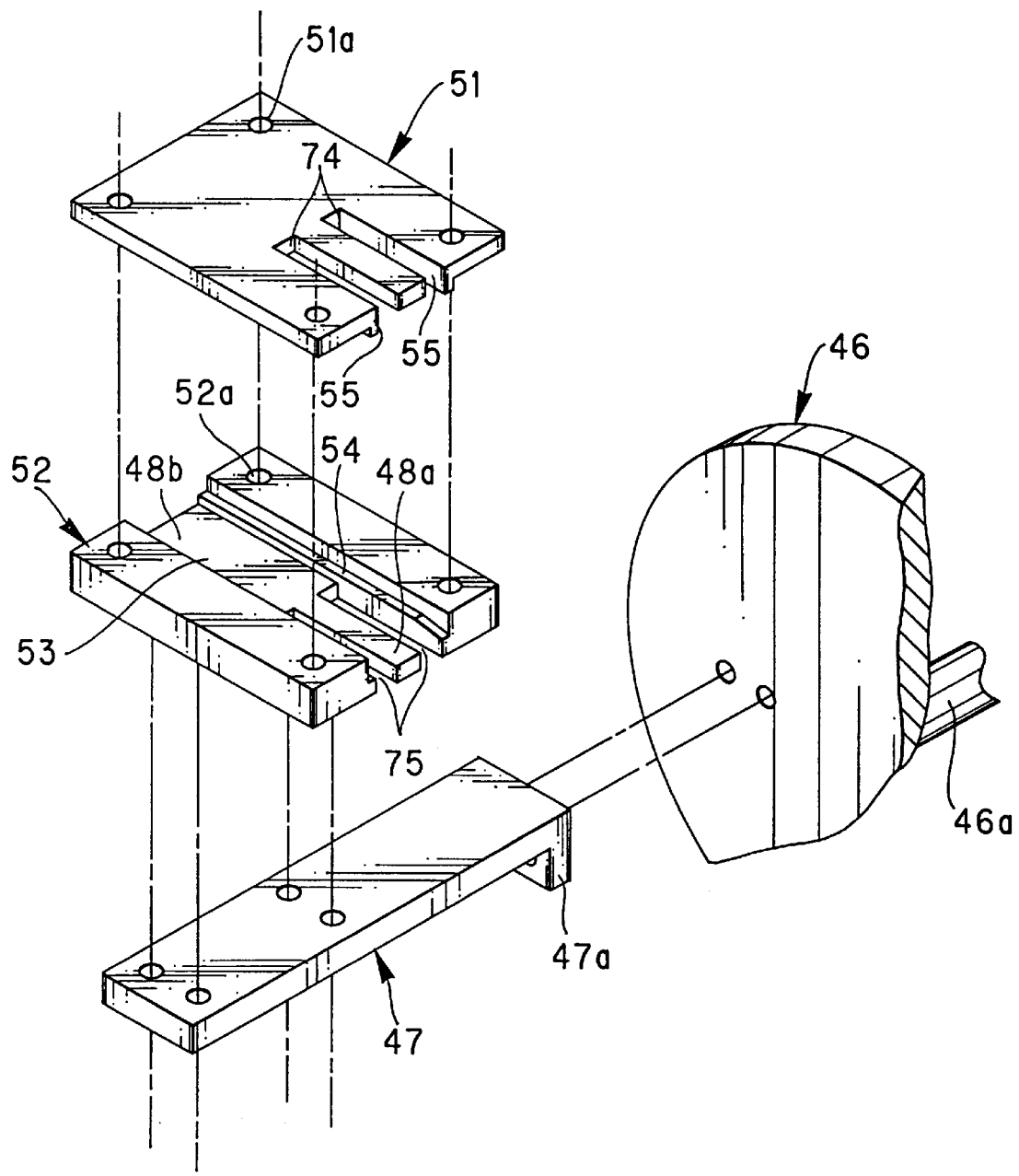
FIG. 9 is an exploded perspective view illustrating the delivery guide device.

As illustrated in FIG. 9, the delivery guide device 48 is constituted of an upper plate 51 and a lower plate 52, each of which is formed of brass, and coated with hard chrome plating. Bolts are inserted into holes 51a at the corners of the upper plate 51 and holes 52a at the corners of the lower plate 52, and adapted to fixation of the upper plate 51 and the lower plate 52. The lower plate 52 includes a long recess 53 directed in a moving direction of the photo film strip 23. Longitudinal edges of the recess 53 have lower ridges 54, which support longitudinal edges of the bottom face of the photo film strip 23 outside effective frame areas. A bottom of the upper plate 51 has upper ridges 55, which are received in the recess 53 with the upper plate 51 fitted on the lower plate 52, and confront the top face of the photo film strip 23 and outside the effective frame areas.

Figure 10:
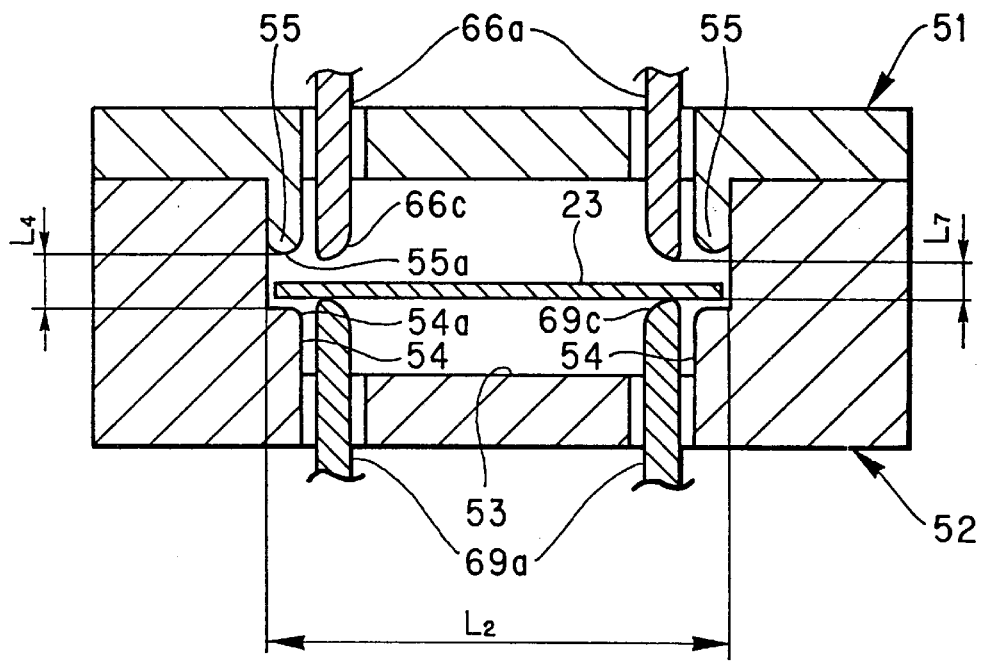
FIG. 10 is a cross section, taken on Line X—X of FIG. 7, illustrating the delivery guide device.

In FIG. 10, a section taken along line A—A of FIG. 7, the width L2 of the recess 53 in the lower plate 52 is 25.5 mm, for the purpose of reliable guidance from the delivery guide device 48 to the transport paths 39a–39g, without hindrance of the photo film strip 23 having the width W=25 mm. The lower ridges 54 and the upper ridges 55 have curvatures 54a and 55a with a radius of 0.5 mm or more. The photo film strip 23 contacts the curvatures 54a and 55a, so that no scratches are created on the photo film strip 23.

Figure 11:
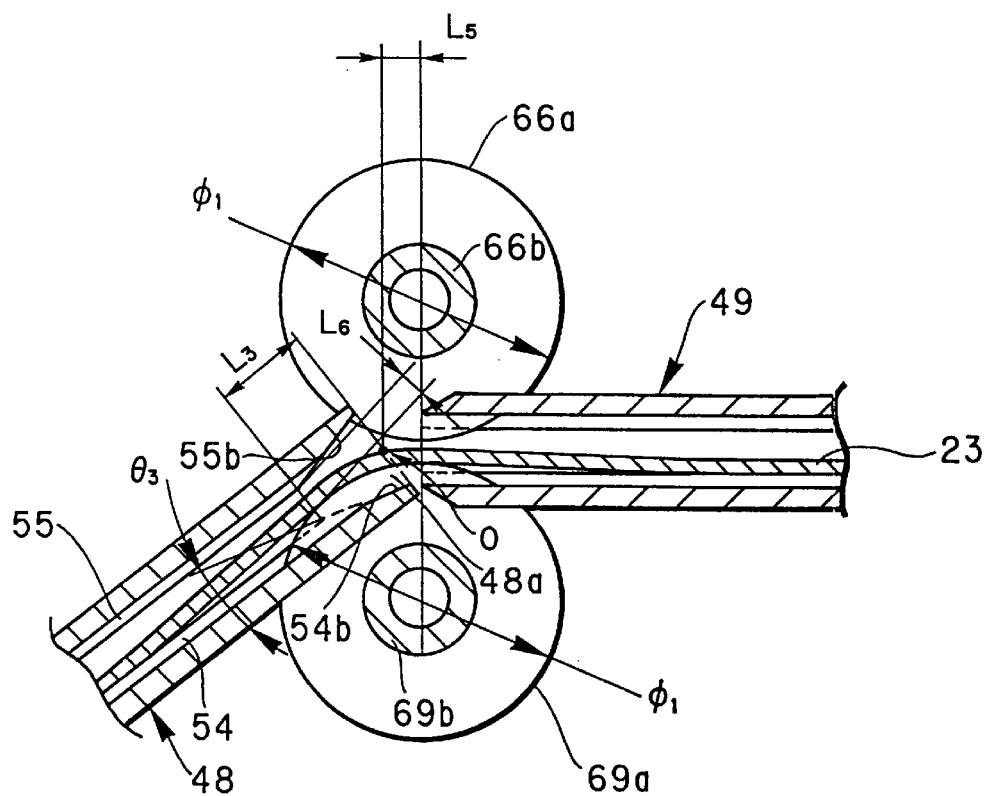
FIG. 11 is an enlarged view illustrating the delivery guide device.

As illustrated in FIG. 11, the lower ridges 54 and the upper ridges 55 have inclined faces 54b and 55b at the receiving slot 48a, for facilitation of insertion of the photo film strip 23 from the stationary guide device 49. The inclined faces 54b and 55b have a length L3 of 25 mm and an angle θ3 of 1.2 degrees. A space L4 (See FIG. 10) between the lower ridges 54 and the upper ridges 55 is 2 mm has a thickness of isomicrons, for permitting easy passage of the photo film strip 23.

As illustrated in FIG. 9, the delivery guide device 48 as assembled is fixed with bolts to a top of the bracket 47 having an L-shape as viewed in section. A lateral side 47a of the bracket 47 is fixed with bolts to the disk 46. A rear of the disk 46 has a rotary shaft 46a, which is connected to the servo motor 45.

Figure 12:
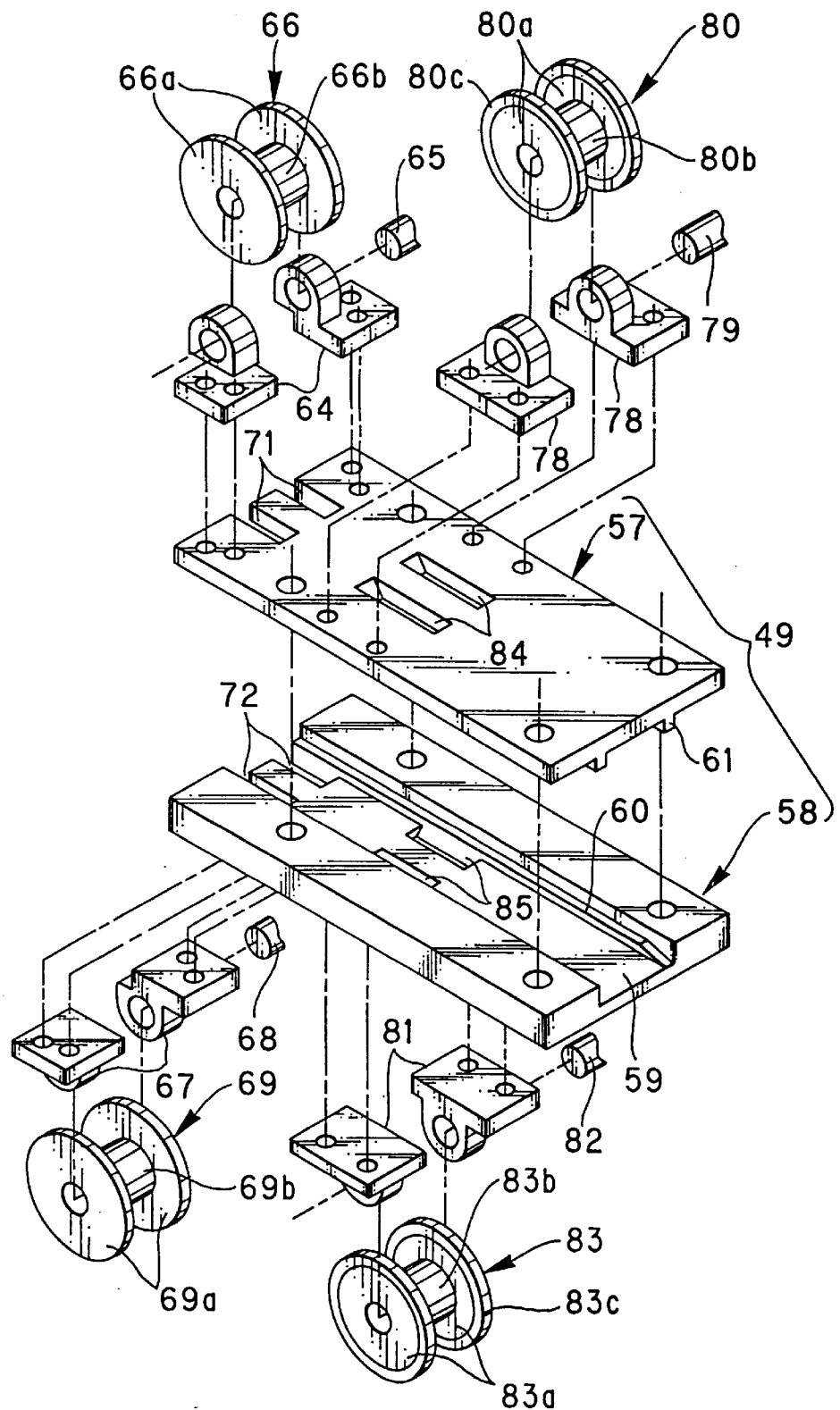
FIG. 12 is an exploded perspective view illustrating a stationary guide device.

As illustrated in FIG. 12, the stationary guide device 49 also includes an upper plate 57 and a lower plate 58, which are fixedly secured together with bolts. The upper plate 57 and the lower plate 58 are formed of brass, and coated with a plating of hard chrome. The stationary guide device 49 also has a long recess 59, lower ridges 60 and upper ridges 61 formed at sizes the same as their counter-parts of the delivery guide device 48. The photo film strip 23 is conveyed through the stationary guide device 49 in fashion similar to the delivery guide device 48.

As illustrated in FIG. 8, a guide roller set 63 is mounted on a top and a bottom of the stationary guide device 49 at its downstream end. The guide roller set 63 includes an upper guide roller 66 and a lower guide roller 69. The upper guide roller 66 is rotatable about a shaft 65, which is supported by bearing members 64 secured to the upper plate 57. The lower guide roller 69 is rotatable about a shaft 68, which is supported by bearing members 67 secured to the lower plate 58. Each of the guide rollers 66 and 69 is constituted of a pair of disk-shaped flanges 66a, 69a, and a core 66b, 69b. The flanges 66a and 69a contact the photo film strip 23. An interval between the flanges 66a and 69a is greater than a width of the effective frame areas on the photo film strip 23, so as to avoid scratching the effective frame areas. The guide roller set 63 is made of general-purpose steel, and has a coating of hard chrome plating.

The upper plate 57 and the lower plate 58 have two pairs of slots 71 and 72, which are positioned to confront the guide roller set 63. The flanges 66a and 69a of the guide rollers 66 and 69 are inserted in the slots 71 and 72. The flanges 66a and 69a also confront pairs of slots 74 and 75, which are formed in the upper plate 51 and the lower plate 52 as illustrated in FIG. 9. When the disk 46 is rotated, the delivery guide device 48 is inclined with reference to the stationary guide device 49. The flanges 66a and 69a are inserted in the slots 74 and 75, so that the guide roller set 63 does not interfere with the delivery guide device 48.

In FIGS. 10 and 11, the guide roller set 63 is set off as much as L5=6 mm in the upstream direction with reference to the axis O of the disk 46. The diameter φ1 of the flanges 66a and 69a is 44 mm. Even when the delivery guide device 48 is positioned at the transport path 39g (See FIG. 7), there is an interval L6 as great as 0.3 mm between the delivery guide device 48 and the guide roller set 63. The photo film strip 23 having the thickness of 150 microns can thus be passed therethrough without difficulty. The interval L7 between the flanges 66a and 69a is 1 mm. Curvatures 66c and 69c are formed around the flanges 66a and 69a and at a radius of 0.5 mm or more. The photo film strip 23 is thus transported without being damaged.

As illustrated in FIG. 8, transport roller set 77 is mounted on the stationary guide device 49 upstream from the guide roller set 63. In FIG. 12, the transport roller set 77 includes an upper transport roller 80 and a lower transport roller 83, in a manner similar to the guide roller set 63. The upper transport roller 80 is rotatable about a shaft 79, which is supported by bearing members 78 secured to the upper plate 57. The lower transport roller 83 is rotatable about a shaft 82, which is supported by bearing members 81 secured to the lower plate 58. Each of the transport rollers 80 and 83 is constituted of a pair of disk-shaped flanges 80a, 83a, a bore 80b, 83b, and a pair of rubber rings 80c, 83c. The rubber rings 80c and 83c are inserted in pairs of slots 84 and 85 formed in the upper plate 57 and the lower plate 58. The transport roller set 77 rotates while squeezing the photo film strip 23 in the stationary guide device 49, to transport the photo film strip 23.

Figure 13:
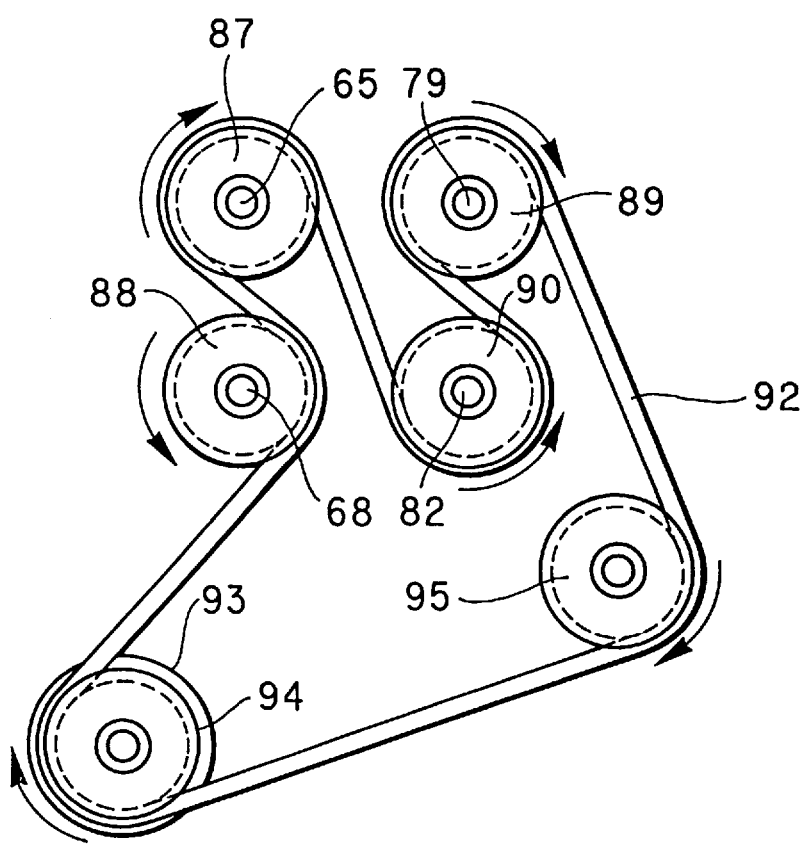
FIG. 13 is an explanatory view illustrating a relationship of driving a guide roller set and a transport roller set.

As illustrated in FIG. 13, ends of the rotary shafts 65, 68, 79 and 82 for the guide roller set 63 and the transport roller set 77 are provided with pulleys 87, 88, 89 and 90., The pulleys 87 to 90 are connected via a belt 92. A servo motor 93 for driving rollers has a pulley 94. The belt 92 is also connected to the pulley 94 and a pulley 95, the latter of which is adapted to application of tension to the belt 92. When the servo motor 93 is driven in the clockwise direction, the pulleys 87 and 89 are rotated clockwise, with the pulleys 88 and 90 rotated counterclockwise. The guide roller set 63 is rotated at the speed equal to that of the transport roller set 77. No frictional scratches occur on the photo film strip 23 at the guide roller set 63, because the rotational speed of the guide roller set 63 is set suitably for the photo film strip 23 as transported by the transport roller set 77. Note that the servo motor 93 rotates the transport roller set 77 to transport the photo film strip 23 at the speed of 200 m/min.

Figure 14:
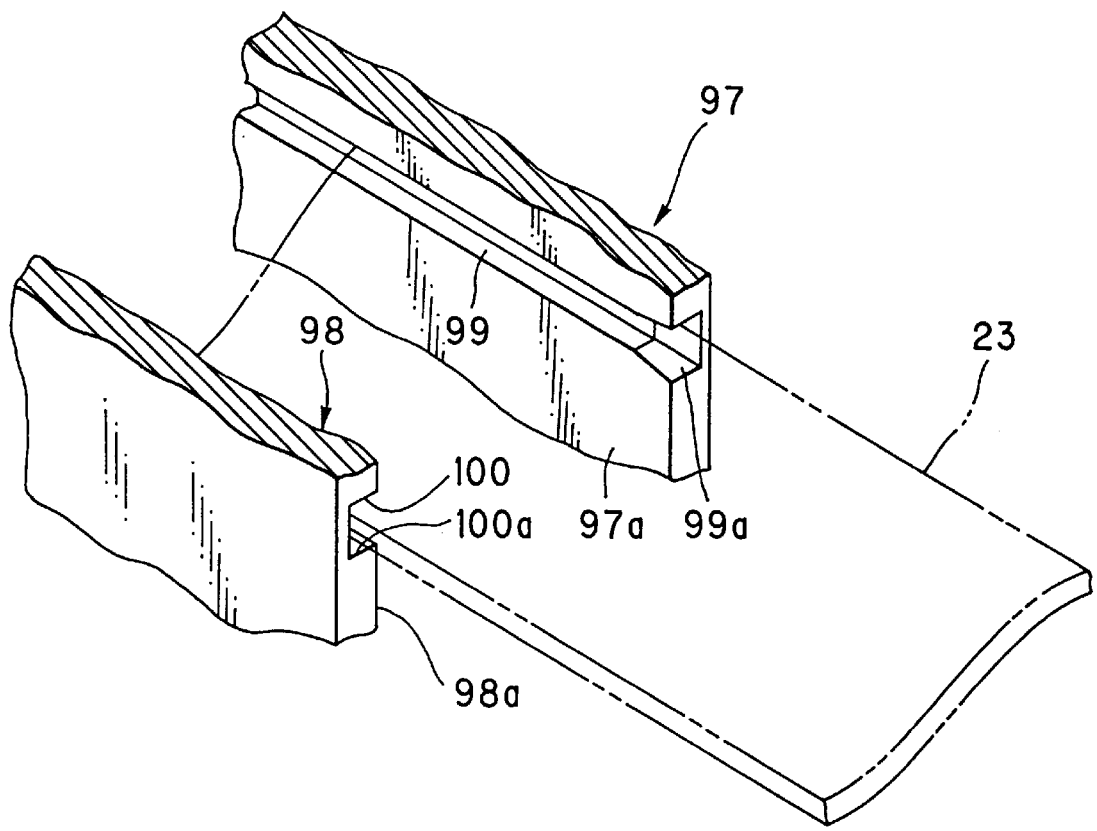
FIG. 14 is a perspective view illustrating a transport path.

Each of the transport paths 39a–39f and 39g between the delivery section 37 and the loaders 38a–38f is constituted of grooves 99 and 100, which, as illustrated in FIG. 14, are formed in confronting faces 97a and 98a of plates 97 and 98. The photo film strip 23 moved from the delivery guide device 48 is transported while supported by the grooves 99 and 100 at longitudinal edges of the photo film strip 23 outside the effective frame areas. Entrances 99a and 100a of the grooves 99 and 100 are inclined broadly as illustrated in FIG. 7, so that the photo film strip 23 is fed reliably into the transport paths 39a–39g.

Operation of the present invention is described below. In FIG. 6, the photo film 31 in the supply section 30 is drawn from the reel 32, and transported to the perforator section 34, where the perforations 26 are formed along the one edge of the photo film 31 as illustrated in FIG. 5, two for one effective frame area. The photo film 31 provided with the perforations 26 is transported to the cutting section 35, where the photo film 31 is measured for the predetermined length, and cut by the cutter 36 into the photo film strip 23. During the cutting, the front and rear ends of the photo film strip 23 are shaped in the leader 28 and the trailer 27. The retaining holes 21 and the holes 24 are formed simultaneously in the trailer 27.

The photo film strip 23 is transported into the stationary guide device 49 of the delivery section 37 with the trailer 27 moved ahead. In the delivery section 37, the servo motor 45 rotates the disk 46 with the delivery guide device 48 about the axis O. The exit slot 48b is stopped in its initial position defined at the transport path 39a. The rotating time lapsed before the stop of the exit slot 48b is at most about 0.1 second, even if the delivery guide device 48 before the rotation was located at the delivery guide device 48g.

The photo film strip 23 entered in the stationary guide device 49 is passed between the upper ridge 61 and the lower ridge 60 (See FIG. 12), until the trailer 27 comes to the transport roller set 77. The photo film strip 23 is nipped by the transport roller set 77. As illustrated in FIG. 13, the transport roller set 77 and the guide roller set 63 are rotated by the belt 92, to which rotation of the servo motor 93 is transmitted by the pulley 94. When the servo motor 93 rotates the pulley 94 clockwise, the pulleys 87 and 89 are rotated clockwise. The pulleys 88 and 90 are rotated counterclockwise. The photo film strip 23 is transported at a speed of 200 m/min.

The photo film strip 23 transported by the transport roller set 77 comes to the guide roller set 63; and is moved into the delivery guide device 48 in contact with the flanges 66a of the upper guide roller 66. The curvatures 66c and 69c, with a radius of curvature of 0.5 or more, contact the photo film strip 23 outside its effective frame areas. The rotation of the guide roller set 63 is as fast as transportation of the photo film strip 23, so that no scratches are created on the photo film strip 23.

In FIG. 11, the receiving slot 48a has the inclined faces 54b and 55b at the lower ridges 54 and 55. The trailer 27 is reliably inserted into the delivery guide device 48. The space between the lower ridges 54 and the upper guide roller 66 is the greater, because the delivery guide device 48 and the guide roller set 63 are deviated by as much as L5. The photo film strip 23 is never bent or scratched accidentally.

The photo film strip 23 having come to the delivery guide device 48 is moved between the lower ridges 54 and 55 on the upper and lower plates 51 and 52. The lower ridges 54 and 55 have the curvatures 54a and 55a, which have a radius curvature of 0.5 or more, and contact the photo film strip 23 outside its effective frame areas. Thus, scratches, are not created on the photo film strip 23.

When passed through the delivery guide device 48, the photo film strip 23 is moved into the transport path 39a. The transport path 39a consists of the grooves 99 and 100. Edge portions of the photo film strip 23 outside the effective frame areas are inserted into the entrances 99a and 100a. The photo film strip 23 is transported toward the loaders 38a.

In the loader 38a, the shutter plate 11 (See FIG. 1) in the cassette shell 2 as supplied via the transfer section 44a has been rotated to an open position. The photo film strip 23 moved through the transport path 39a is transported by the transport rollers in the loader 38a. The trailer 27 is inserted into the photo film passageway 10. The trailer 27 of the photo film strip 23 accessing to the cassette shell 2 is inserted in the slot 17 in the spool 5. The retaining holes 21 and the hooks 18 are retained. The spool 5 is rotated in the winding direction, to wind all the photo film strip 23 into the cassette shell 2, before the shutter plate 11 is rotated to the closed position. The photo film cassette is completely assembled. The photo film cassette is moved by the transfer section 44a to the supply/exit section 43a, and exited to next station treating the cassette.

The delivery guide device 48 is positioned successively at the transport paths 39b–39f. The photo film strip 23 is transported to the loaders 38b–38f. Any defective photo film strips having failure perforations or cuts are exited to the receptacle tray 40 while the delivery guide device 48 is positioned at the transport path 39g.

In the embodiment, the photo film strip is moved during delivery in the seven directions, that is, toward the six loader sections and the receptacle tray. The number of such directions for the photo film strip may be greater or smaller.

The above embodiment has specifics of parts of the loader section in accordance with the width W (=25 mm) and the thickness t (=150 microns) of the photo film strip, and the delivering angle θ (=66 degrees), as follows:

L1=75 mm;
L2=25.5 mm;
L3=25 mm;
L4=2 mm;
L5=6 mm;
L6=0.3 mm;
L7=1 mm;
φ=160 mm;
φ1=44 mm;
θ3=1.2°;

Speed of transporting the photo film strip 23: 200 m/minute;

Time to the stop position for the exit slot 48b: 0.1 second;

Material for the delivery guide device 48 and the stationary guide device 49: brass;

Surface finish of the delivery guide device 48 and the stationary guide device 49: hard chrome plating;

Material for the guide roller set 63: general-purpose steel;

Surface finish of the guide roller set 63: hard chrome plating.

However, it is possible to modify the specifics in preferred ranges, in optimum fashion for any width W and the thickness t of photo film strip, and the delivering angle θ. The preferred ranges are as follows.

$30 \leq L1 \leq 150$ (mm);
$10 \leq L2 \leq 100$ (mm);
$15 \leq L3 \leq 50$ (mm);
$0.5 \leq L4 \leq 4$ (mm);
$0 \leq L5 \leq 30$ (mm);
$0.3 \leq L6 \leq 2$ (mm);
$0.5 \leq L7 \leq 3$ (mm);
$\phi = 160$ (mm);
$30 \leq \phi 1 \leq 100$ (mm);
$15 \leq \theta \leq 120$ (°);
$1 \leq \theta 3 \leq 10$ (°);

Speed of transporting the photo film strip 23: from 1 to 400 m/minute;

Time to the stop position for the exit slot 48b: from 0.05 to 0.2 second;

Material for the delivery guide device 48 and the stationary guide device 49: brass, general-purpose steel, stainless steel, aluminum and teflon;

Surface finish of the delivery guide device 48 and the stationary guide device 49: hard chrome plating;

Material for the guide roller set 63: general-purpose steel, stainless steel, aluminum and teflon;

Surface finish of the guide roller set 63: hard chrome plating.

Figure 15:
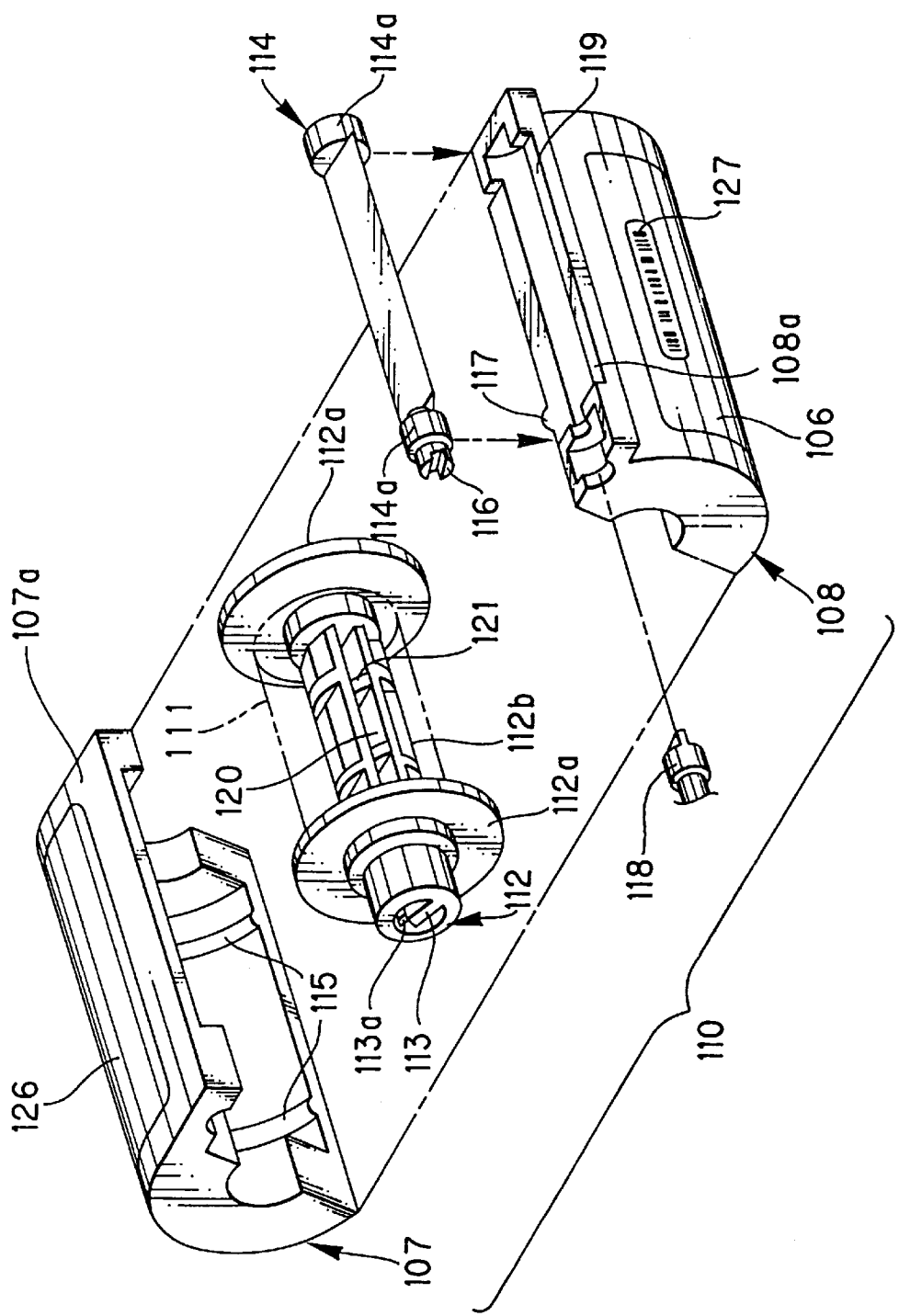
FIG. 15 is an exploded perspective view illustrating a photo film cassette used in another preferred system for producing the photo film cassette.

Another preferred system for cassette assembly is referred to below. FIG. 15 illustrates a photo film cassette 110 to be assembled. A cassette shell 109 is constituted by an upper shell half 107, a lower shell half 108, and a spool 112, respectively molded as single pieces of plastics.

Inner walls of the shell halves 107 and 108 have a pair of ridges 115. When a photo film strip 111 (See FIG. 16) is wound about the spool 112 and contained between the shell halves 107 and 108, the ridges 115 contact the periphery of the roll of the photo film strip 111 to prevent it from loosening around the spool 112. A reference numeral 117 designates a separator claw, which, during rotation of the photo film strip 111, abuts on a leading end of the photo film strip 111, and separates it from the roll, so as to guide a leader of the photo film strip 111 to an exterior of the cassette shell 109.

The shell halves 107 and 108 have tongue portions 107a and 108a, which, when the shell halves 107 and 108 are fitted together, are joined to define a photo film passageway 119. A shutter plate 114 is incorporated between the tongue portions 107a and 108a. Ends of the shutter plate 114 have shaft portions 114a; which render the shutter plate 114 rotatable in parallel with the spool 112. One of the ends of the shutter plate 114 has a key 116, which appears externally through a surface of the cassette shell 109. When an opener member 118 is fitted on the key 116 and rotates it, the shutter plate 114 is rotationally changed between an open position where the photo film passageway 119 is open and a closed position where the photo film passageway 119 is closed.

The spool 112 has a pair of flanges 112a formed integrally therewith. The photo film strip 111 is wound on a core 112b of the spool 112 and between the flanges 112a. Ends of the spool 112 appear through the faces of the cassette shell 109, and respectively have a key 113. An end of the key 113 has a notch 113a.

A slot 120 is formed in the core 112b of the spool 112. The inside of the slot 120 has a pair of hooks 121 and a pair of ridges 122. The ridges 122 are projected downward between the hooks 121. The slot 120 has an entrance for insertion. A trailer 124 of the photo film strip 111 is inserted into the entrance.

In the trailer 124 of the photo film strip 111 are formed a pair of retaining holes 125. The hooks 121 are engaged with the retaining holes 125. The trailer 124 of the photo film strip 111 also has a pair of holes 126 next to the retaining holes 125. The holes 126 are utilized for insertion and attachment of the trailer 124 into the slot 120.

There is a sticker 106 attached to the cassette 109 before the photo film strip 111 is loaded. The sticker 106 has an ID code 127 having a bar code form printed below the port portion 108*a*. The ID code 127 represents a serial number of the cassette 109 and its manufacturing date.

Figure 16:
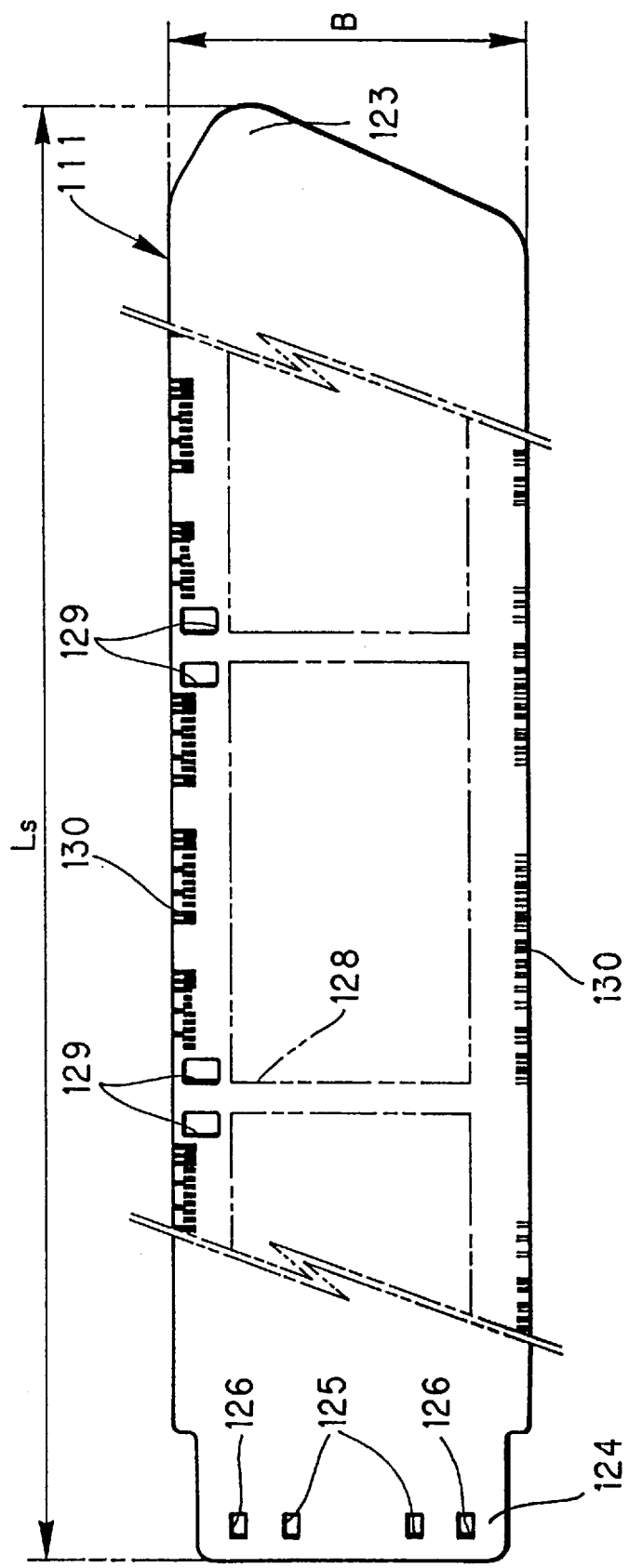
FIG. 16 is an explanatory view illustrating a photo film strip.

The photo film strip 111 to be contained in the cassette shell 109 has a length LS from 500 to 1700 mm, as illustrated in FIG. 16. The length LS depends on the available maximum number of exposures to be taken on the photo film strip 111. The width W of the photo film strip 111 is for example 25 mm.

There are perforations 129 formed in positions near to one of the longitudinal edges of the photo film strip 111. The photo film strip 111 also has bar codes 130 in form of latent images along its edges. The bar codes 130 represent information inclusive of frame numbers, film speed, the ID code, and photographable maximum number of exposures for the film. The ID code comprises a serial number of the cassette 109, and its manufacturing date.

The photo film strip 111 includes a support having thickness of 70 to 120 microns, and a coating of photosensitive emulsion layer applied to the support at thickness of 2 to 4 microns. The support is formed of polyethylene-2,6-naphthalate (PEN). The elasticity and the coefficients of static friction of the photo film strip 111 are experimentally measured: the modulus of elasticity in tension is 400 to 750 kg/mm$^2$; the static friction coefficient of an emulsion surface of the photo film strip 111 is 0.16; and the static friction coefficient of a back surface of the photo film strip 111 is 0.12.

Figure 17:
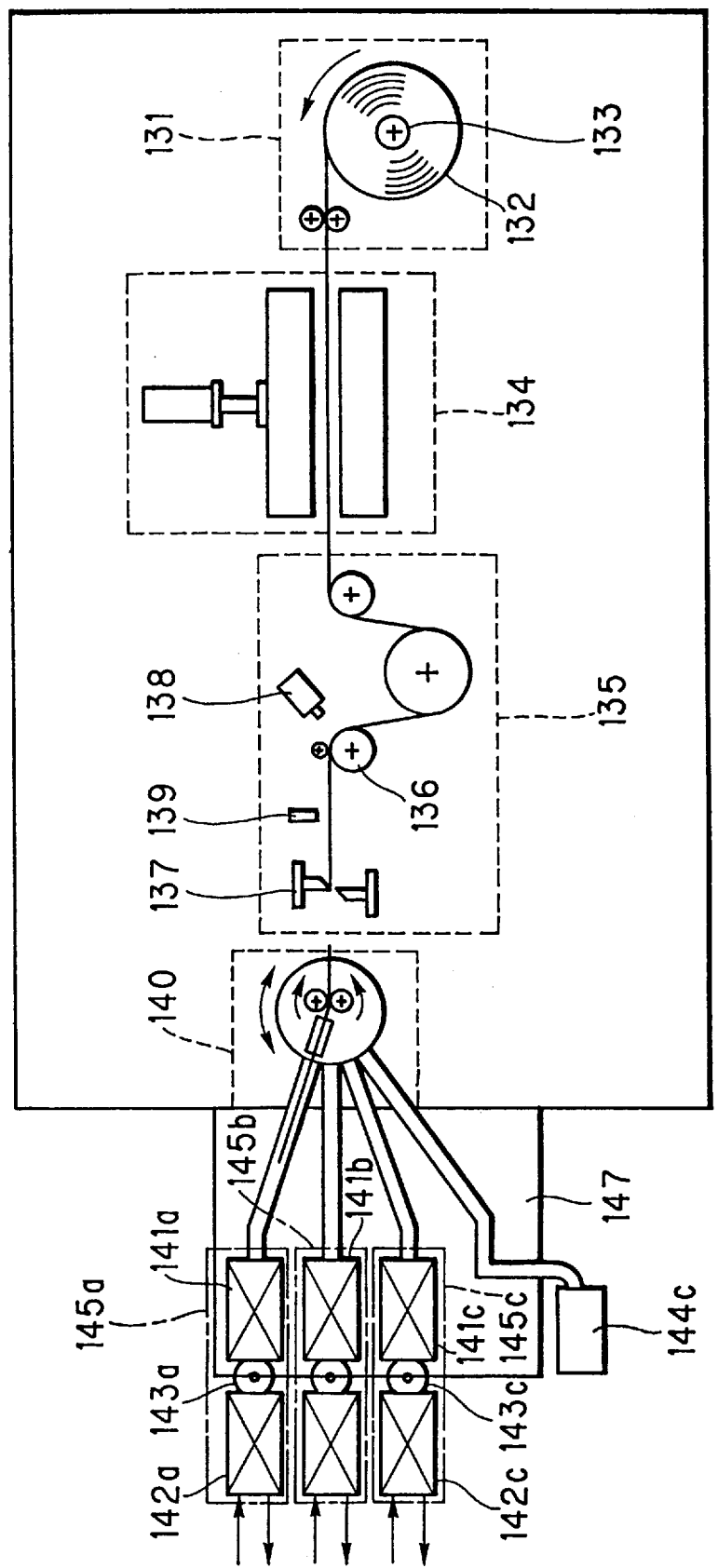
FIG. 17 is an explanatory view schematically illustrating the cassette producing system.

The system for cassette assembly is referred to below. In FIG. 17, the assembling system consists of a photo film supply section 131, a cutting section 135, a delivery section 140, and three photo film loader apparatuses 145*a*–145*c*. Each of the photo film loader apparatuses 145*a*–145*c* is unified, and includes a loader section 141*a*–141*c*, a supply/exit section 142*a*–142*c* and a transfer section 143*a*–143*c*.

In the photo film supply section 131, a reel 133 is set and has continuous photo film 132. The continuous photo film 132 includes a support and a coating of photosensitive emulsion surface, and wound about the reel 133 with its emulsion, surface wound outside. The continuous photo film, 132 is drawn from the reel 133 horizontally, and transported to a perforator section 134, where the perforations 129 are consecutively formed in the continuous photo film 132. Then the continuous photo film 132 is cut by the cutting section 135 at the regular length into the photo film strip 111.

The cutting section 135 has an intermittent feeding roller 136, a cutting mechanism 137, a preexposure device 138 and a sensor 139. The preexposure device 138 effects preexposure to the photo film to form the bar codes 130 as latent images inclusive of the ID code. The sensor 139 is adapted to detecting the perforations 129. Note that numbers may be formed by a preexposure device instead of the bar codes 130.

The cutting mechanism 137 is operated after the photo film strip 111 is oriented by the delivery section 140 and fed by the intermittent feeding roller 136 at the regular length, which is described in detail below. A rear end of the photo film strip 111 relative to the transport direction is formed in the shape of the leader 123 in FIG. 16. A front end of the photo film strip 111 relative to the transport direction is formed in the shape of the trailer 124. Simultaneously the holes 125 and 126 are formed. The preexposure device 138 prerecords the bar codes 130 on the photo film strip 111 in accordance with the ID code 127 as read by photo film loader section 143*a*–143*c* from the cassette 109, as described below.

The photo film strip 111 is sent into the delivery section 140 with the trailer 124 advanced ahead, and delivered into each of the loader sections 141*a*–141*c*. It is taken into consideration in the delivery that the ID code of the photo film strip 111 to be contained in the cassette 109 coincides with the ID code of the cassette 109. The loader sections 141*a*–141*c* are disposed in a light-tight dark compartment 147, i.e. a dark room, and is connected respectively to the supply/exit sections 142*a*–142*c* disposed in a bright room. The transfer sections 143*a*–143*c*, disposed between the supply/exit sections 142*a*–142*c* and the loader sections 141*a*–141*c*, prevent ambient light from entering the dark compartment 147. The photo film supply section 131, the perforator section 134, the cutting section 135 and the delivery section. 140 are arranged also in a light-tight dark compartment.

The cassette 109 is transferred from the supply/exit section 142*a* by the transfer section 143*a* to the loader section 141*a*. The transfer section 143*a* has read the ID code 127 from the cassette 109, and transmitted information of it to the preexposure device 138. The loader section 141*a* rotates the shutter plate 114 to the open position, and engages the trailer 124 with the spool 112. Then the spool 112 is rotated to wind the whole of the photo film strip 111 around the spool 112. The loader section 141*a* rotates the shutter plate 114 to the closed position to terminate its operation.

The photo film cassette 110 as assembled is transferred from the loader section 141*a* by the transfer section 143*a* to the supply/exit section 142*a*. In the meantime the ID code 127 on the cassette 109 is read again. It is checked whether the information of reading the ID code 127 coincides with data of preexposure of the ID code to the photo film strip 111, so as to confirm the identification of the cassette with the photo film strip. Then the photo film cassette 110 is conveyed to the packaging station. A defective photo film strip, for example detected by the sensor 139 as lacking the perforations 129, is exited to a receptacle tray 144 by the delivery section 140.

Each of the loader sections 141*a*–141*c*, the transfer sections 143*a*–143*c* and the supply/exit sections 142*a*–142*c* can handle 15 to 25 products of the cassette 109 per minute. If three lines are arranged in parallel, the cassette assembling system can handle 45 to 75 products of the cassette 109 per minute.

Figure 18:
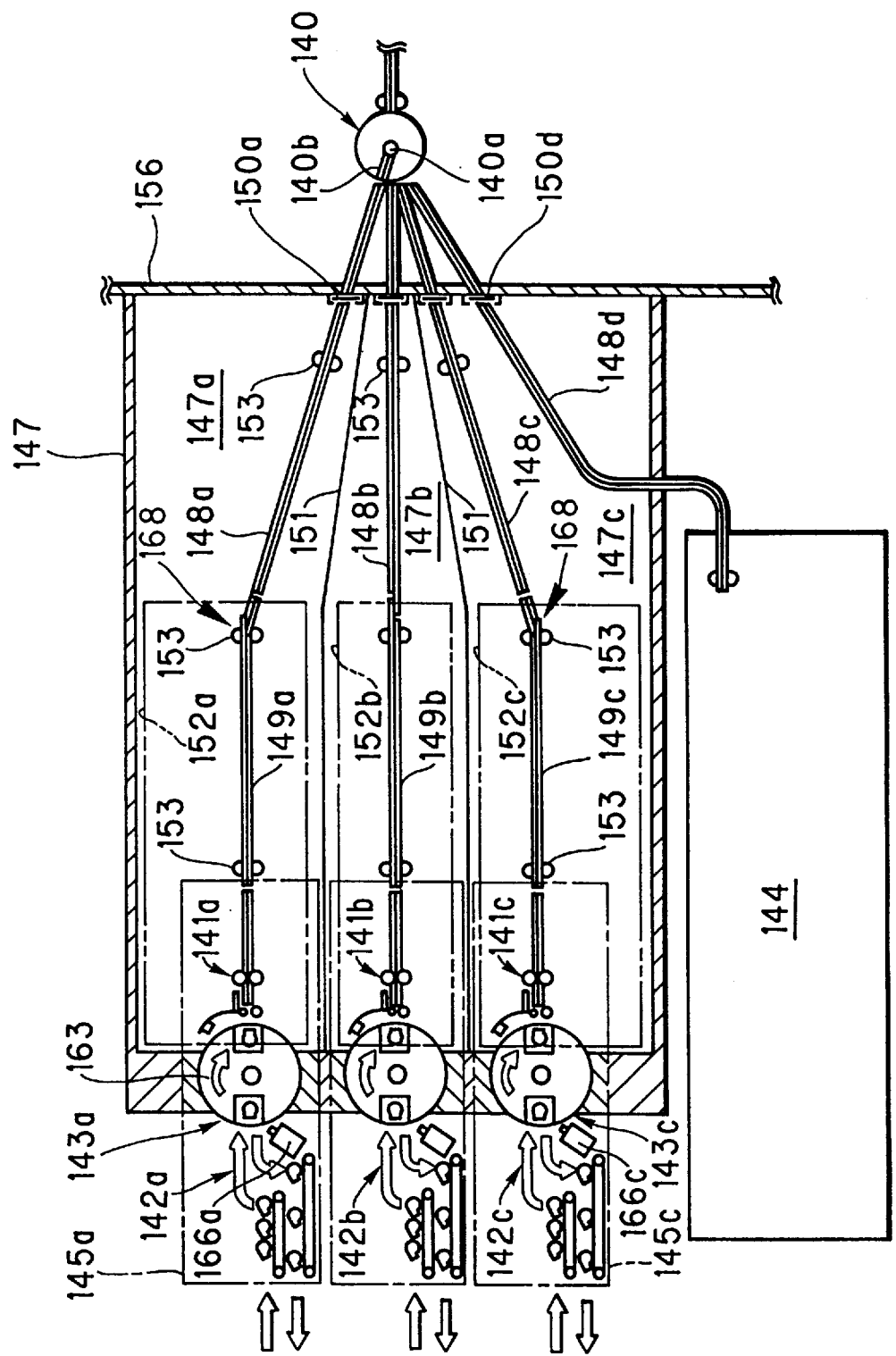
FIG. 18 is an explanatory view illustrating a combination of a delivery section, and three photo film loader apparatuses.

FIG. 18 schematically illustrates an arrangement of the delivery section 140, the loader sections 141*a*–141*c*, the supply/exit sections 142*a*–142*c* and the transfer sections 143*a*–143*c*. The delivery section 140 has a delivery guide device 140*b* which is caused to rotate about an axis 140*a* at a regular pitch to deliver the photo film strip 111 into transport paths 148*a*–148*d* constituting a photo film transport apparatus.

The radial paths 148*a*–148*d* are disposed radially about the shaft 140*a*. The radial paths 148*a*–148*c* are connected respectively to horizontal paths 149*a*–149*c* constituting the transport section inside the dark compartment 147. The horizontal paths 149a–149c are connected respectively to the loader sections 141a–141c. The radial path 148d is connected to the receptacle tray 144 disposed outside the dark compartment 147.

The inside of the dark compartment 147 is separated into dark chambers 147a, 147b and 147c by two partitions 151. The dark chamber 147a contains the radial path 148a, the horizontal path 149a and the loader section 141a. The chambers 147b and 147c contain counterparts of those contained in the dark chamber 147a.

Each of the lengths of the radial paths 148a–148d and the horizontal paths 149a–149c inside the dark compartment 147 is 1700 mm or more for the purpose of containing the whole length of the photo film strip 111 which may have a maximum length. The radial paths 148a–148d and the horizontal paths 149a–149c are all straight, so that it is possible to equalize the duration of passage of the photo film strip 111 for each one.

The horizontal path 149a, as illustrated in FIG. 19, includes an upper guide plate 154 and a lower guide plate 155 combined in a light-tight labyrinth fashion. Between the upper and lower guide plates 154 and 155 is formed a passageway for the photo film strip 111. The passageway contacts the portions of the photo film strip 111 outside its effective frame areas. The upper and lower guide plates 154 and 155 are made of iron, brass or the like, which is coated with a hard chrome plating. Horizontal paths 149b, 149c and the radial paths 148a–148c have a structure similar to the horizontal path 149a.

Doors 152a–152c are disposed on a side of the dark compartment 147 in association with the loader sections 141a–141c, for the purpose of access to the loader sections 141a–141c when a breakdown occurs to any of them. Even though the door 152a is opened for the loader section 141a, the partitions 151 prevent ambient light from entering the loader sections 141b and 141c through the door 152a, to protect the photo film through the loader sections 141b and 141c. There are disposed shutter mechanisms 150a–150d at entrances of the dark compartment 147 in association with the radial paths 148a–148d, for the purpose of preventing ambient light through the doors 152a–152c from entering the delivery section 140.

The shutter mechanisms 150a–150d, as illustrated in FIG. 20, are disposed in a wall 156 of the dark compartment 147 confronting the delivery section 140. The wall 156 has openings 158, through which the radial paths 148a–148d are respectively extended. There is a gap formed to interrupt each of the radial paths 148a–148d. A shutter plate 157 is inserted in the gap, to close the opening 158. Opening movement of the doors 152a–152c is effected respectively in association with closing movement of the shutter mechanisms 150a–150c. The shutter mechanism 150a must be closed before the door 152a can be opened. This is the situation of the shutter mechanism 150b with respect to the door 152b, and the shutter mechanism 150c with respect to the door 152c.

A number of drive nipping roller sets 153 are incorporated in the radial paths 148a–148d and the horizontal paths 149a–149c to transport the photo film strip 111. Some of the nipping roller sets 153 are located at connecting portions between the radial and horizontal paths 148a–148c and 149a–149c.

Figure 21:
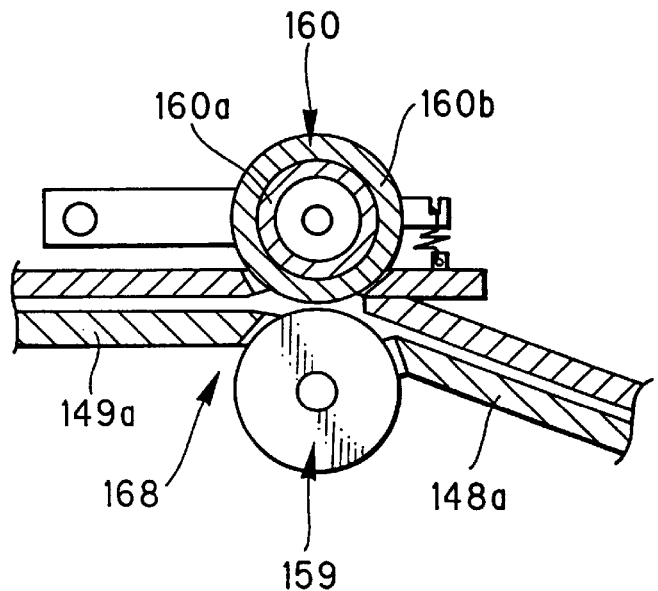
FIG. 21 is an explanatory view illustrating a drive roller set.

The radial path 148a is connected to the horizontal path 149a at a sloping connecting portion 168 with an obtuse angle. The sloping connecting portion 168 has the nipping roller set 153 in combination of a drive roller 159 and a driven roller 160, as illustrated in FIG. 21. The driven roller 160 is biased by a spring 161 to contact the drive roller 159. The driven roller 160 is a rubber roller, which includes a metallic core 160a and a rubber member 160b coiled thereabout for the purpose of avoiding scratching the photo film strip 111. As the sloping connecting portion 168 associated with the nipping roller set 153, the photo film strip 111 can be transported smoothly, continuously, and in a direction parallel to the radial path 148b.

The loader apparatuses 145a–145c are easily removable from the dark compartment 147 upon occurrence of a breakdown. When the loader apparatuses 145a–145c are mounted on the dark compartment 147, the wall of the dark compartment 147 holds the transfer sections 143a–143c of the loader apparatuses 145a–145c in a light-tight fashion. The loader sections 141a–141c are shielded from ambient light the inside the dark compartment 147. The supply/exit sections 142a–142c are in the bright room outside the dark compartment 147.

Figure 22:
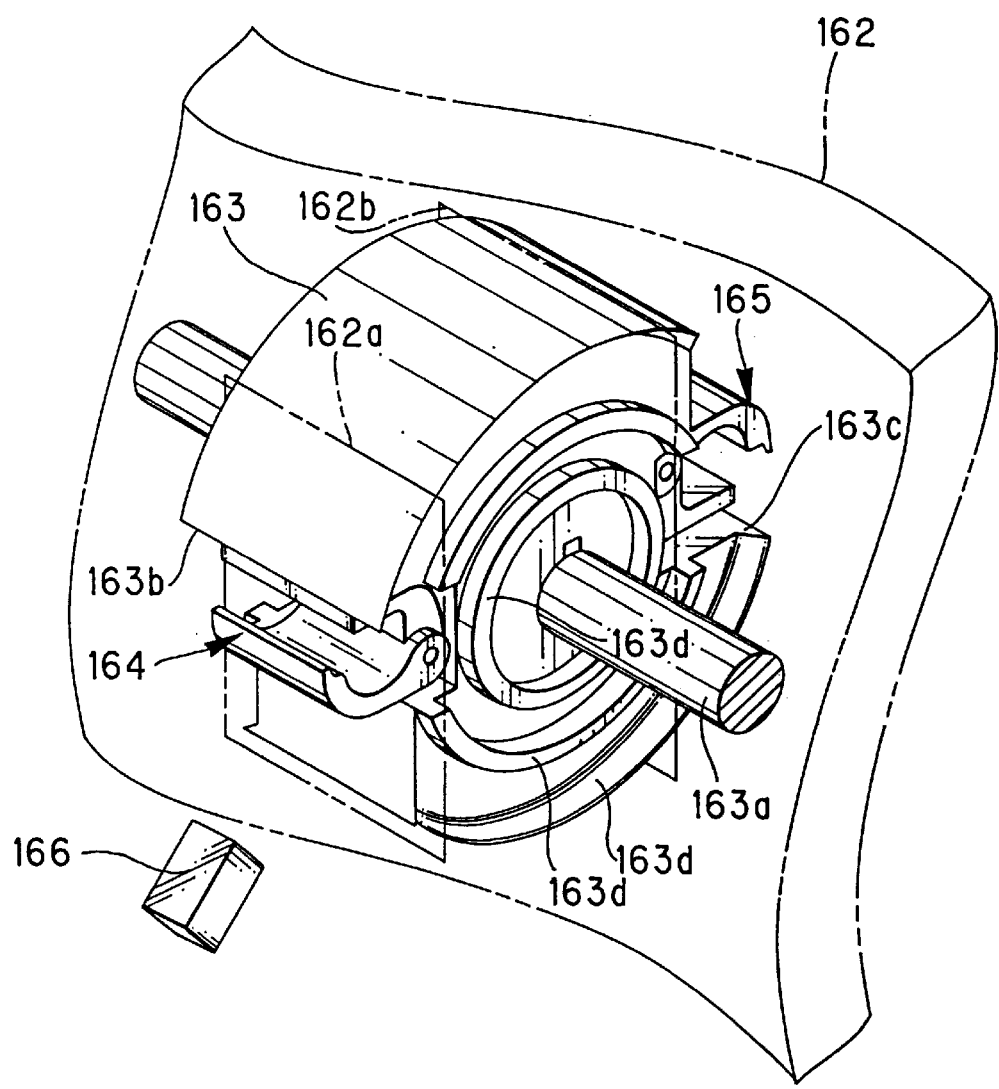
FIG. 22 is a perspective view illustrating the cassette holder.

The transfer section 143a transfers the cassette 109 from the supply/exit section 142a to the loader section 141a. As illustrated in FIG. 22, the transfer section 143a includes a light-tight casing 162 and a rotary barrel 163. The light-tight casing 162 is fitted inside the dark compartment 147, includes a hollowness defined between its two portions, and supports the rotary barrel 163 in rotatable fashion about a shaft 163a.

Figure 23:
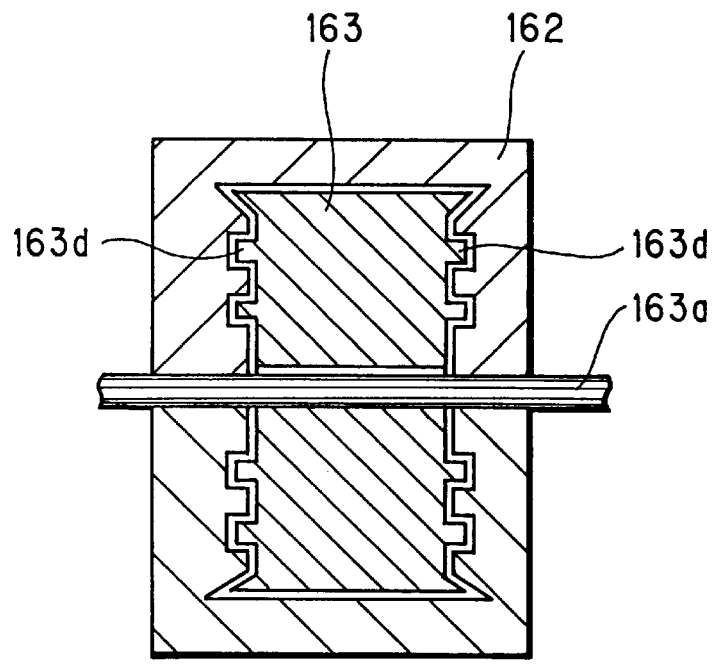
FIG. 23 is a vertical section illustrating the cassette holder.
Figure 24:
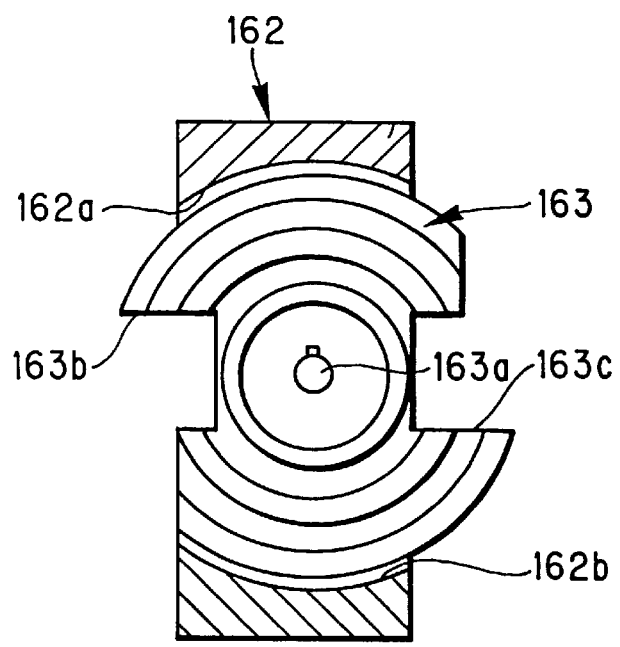
FIG. 24 is a cross section illustrating the cassette holder.

The rotary barrel 163 has a cylindrical shape. In FIGS. 23 and 24, the light-tight casing 162 has a large thickness. Even when ambient light is externally applied to a top or bottom of an opening 162a, the light is reflected in gaps over and below the rotary barrel 163 in the opening 162a and at a plurality of times, and well absorbed at surfaces of the gaps to diminish the light sufficiently to protect the inside of the dark compartment 147 from the light. Plural ridges 163d are disposed on two sides of the rotary barrel 163, and have arcuate shapes about the axis of rotation. Lateral faces inside the light-tight casing 162 between the openings 162a and 162b are formed in correspondence with lateral faces of the rotary barrel 163. Even when ambient light is externally applied to vertical sides of the opening 162a, none of the light comes into the dark compartment 147.

The rotary barrel 163 has recesses 163b and 163c which are rotationally symmetrical to each other. Cassette holders 164 and 165 are mounted in the recesses 163b and 163c to support the cassette 109. The openings 162a and 162b in the light-tight casing 162 render the cassette holders 164 and 165 accessible respectively from the supply/exit section 142a and from the loader section 141a.

An initial orientation of the transfer section 143a is determined as such depicted in FIG. 22, where the rotary barrel 163 is so directed that the cassette holder 164 is at the supply/exit position, and that the cassette holder 165 is at the loading position. In the supply/exit position, the cassette 109 is supplied from the supply/exit section 142a, and held by the cassette holder 164. At the same time, a sensor 166 in the transfer section 143a detects the ID code 127. Information of the ID code 127 as read is sent to the preexposure device 138 of the cutting section 135.

After reading of the ID code 127, the rotary barrel 163 is caused to make half a rotation, to set the cassette 109 in the loading position. The loader section 141a loads the cassette 109 in the loading position with the photo film strip 111, to obtain the photo film cassette 110 while the cassette 109 remains held in the cassette holder 164. In the course of loading, the cassette holder 165 in the supply/exit position is being supplied with a second cassette shell 109.

After the loading operation of the loader section 141a, the transfer section 143a causes the rotary barrel 163 to make half a rotation. The photo film cassette 110 loaded with the photo film strip 111 is moved rotationally to the supply/exit position. With the movement terminated, the photo film cassette 110 is exited from the cassette holder 164 to the supply/exit section 142a. In the course of the exiting, another cassette in the loading position is loaded with another photo film strip by way of the cassette holder 165.

Figure 25:
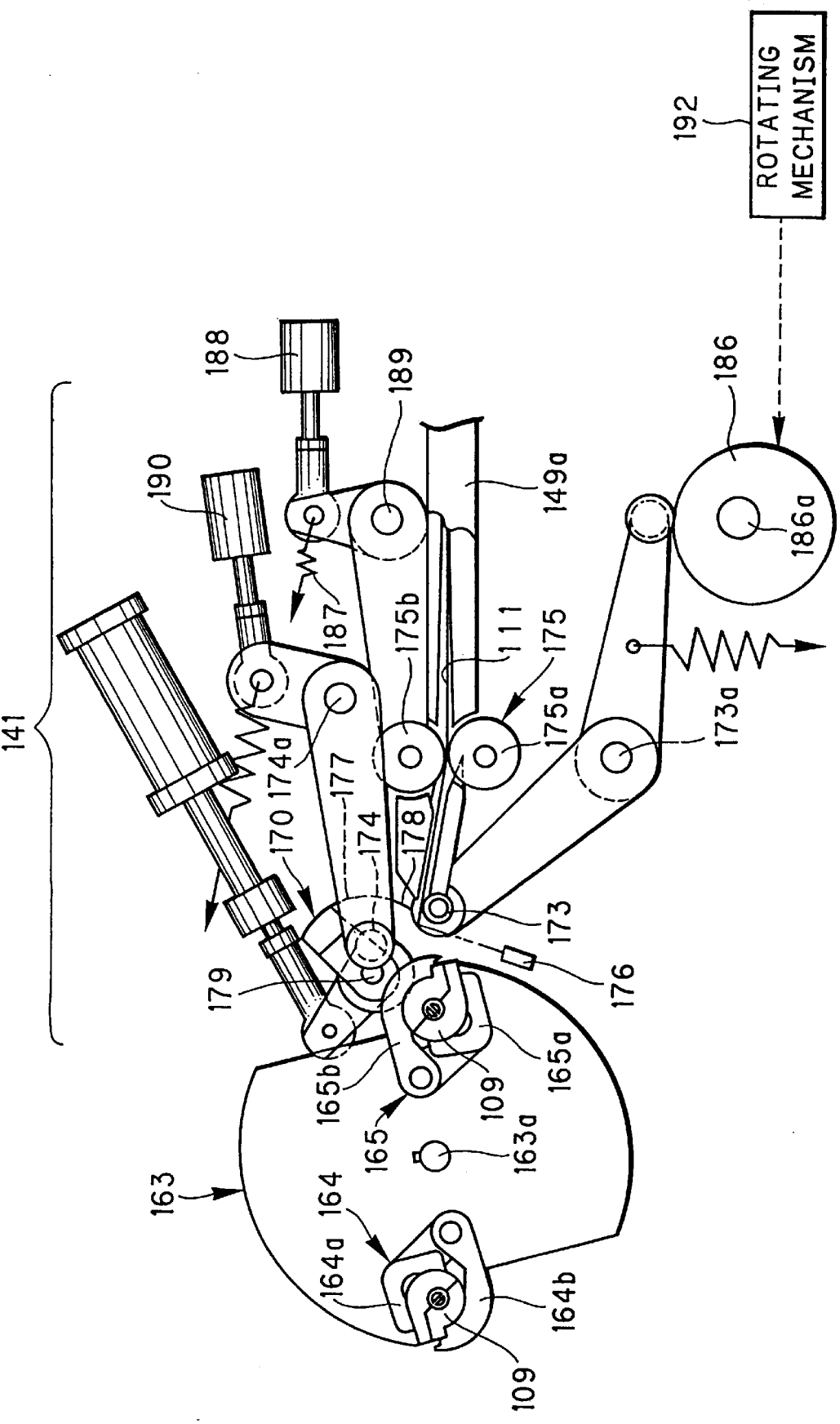
FIG. 25 is an explanatory view schematically illustrating a photo film loader apparatus.

The cassette holder 164 includes a stationary plate 164a and a movable plate 164b. Similarly, the cassette holder 165 includes a stationary plate 165a and a movable plate 165b. The stationary plates 164a and 165a have a receiving portion shaped to receive the cassette 109 as illustrated in FIG. 25. The movable plates 164b and 165b are rotatably mounted on the stationary plates 164a and 165a, are driven via hydraulic cylindrical devices and/or linking mechanisms (not shown), and when the receiving portion is supplied with the cassette 109, grasp the cassette 109.

When the cassette 109 is squeezed by the movable plates 164b or 165b, the cassette 109 is kept oriented regularly due to the shape of the receiving portion and receipt of the tongue portions. Thus passageway 119 is directed regularly. A direction of the passageway 119 is inclined slightly upward for the loading position.

Figure 26:
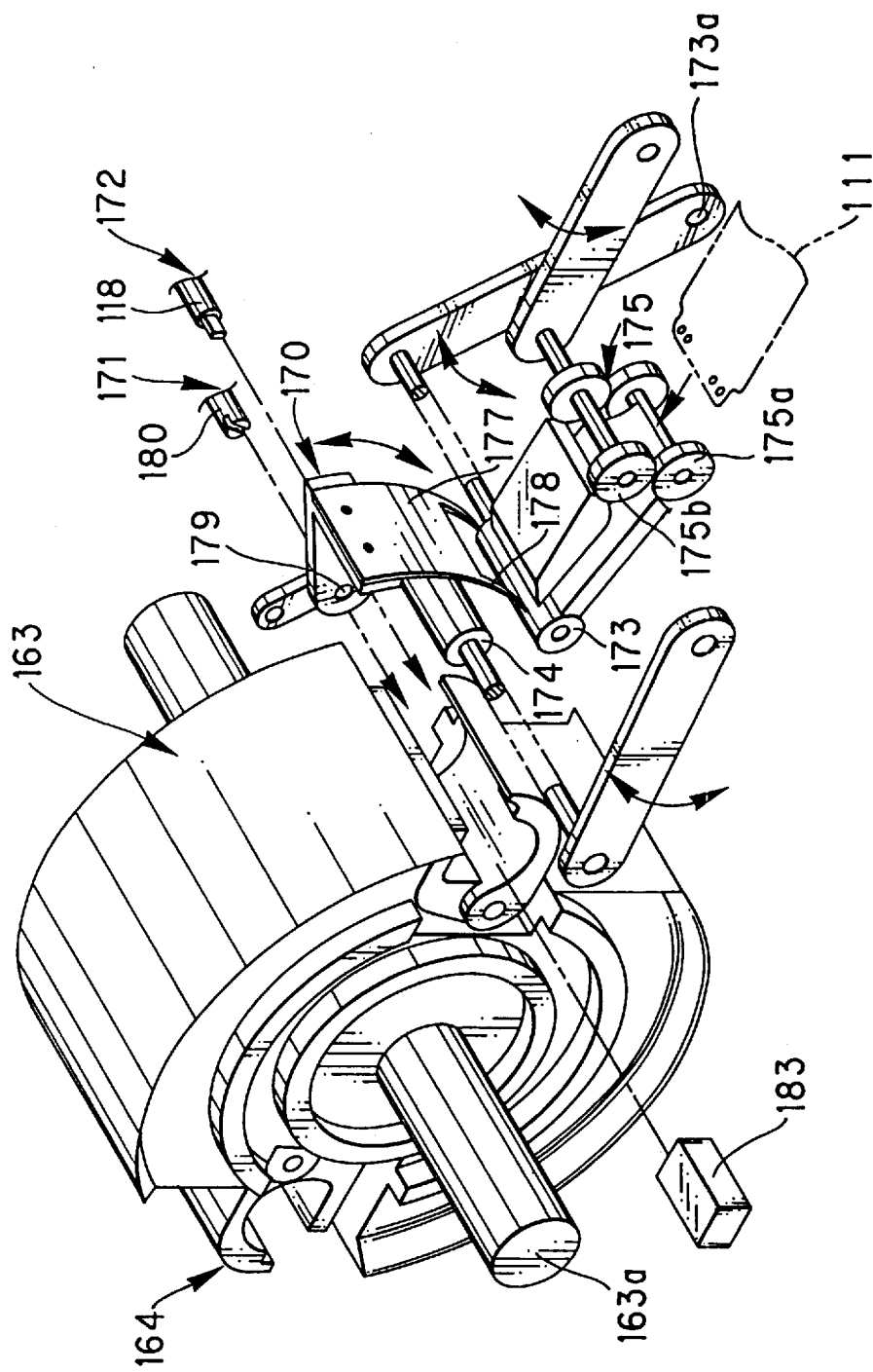
FIG. 26 is a perspective view illustrating the photo film loader apparatus.

Each of the loader sections 141a–141c, as illustrated in FIGS. 25 and 26, includes a retainer mechanism 170 for the trailer, a drive mechanism 171 for the spool, an opener mechanism 172 for the shutter plate, a support roller 173 for the trailer, a back tension roller 174 and an insert tension roller set 175.

When transported from the horizontal path 149a, the photo film strip 111 is nipped by the insert tension roller set 175. The insert tension roller set 175 includes a drive roller 175a and a driven roller 175b. The drive roller 175a is rotated in synchronism with the drive roller 159 of the nipping roller sets 153. The photo film strip 111 is transported until being projected over the support roller 173 by a small amount.

A sensor is disposed under the support roller 173 for detecting the trailer 124. Upon detection of the trailer 124 at the sensor 176, the drive roller 175a and 159 are stopped from rotating, to stop transporting the photo film strip 111. The trailer 124 stands supported by the support roller 173. The support roller 173 is standing by with the trailer 124 located in a rotational locus of an insert plate 177, which is described below in detail. The standby position of the support roller 173 is higher than the passageway 119, so that the photo film strip 111, after capturing of trailer 124, follows the rotational locus of the insert plate 177.

The opener mechanism 172 includes the opener shaft 118 engaged with the key 116 of the shutter plate 114, and a drive unit for driving the opener shaft 118. The drive unit includes a shifting mechanism and a motor. The shifting mechanism shifts the opener shaft 118 between a retracted position and an engaged position of engagement with the key 116, The motor rotates the opener shaft 118 to displace the shutter plate 114 rotationally between the open and closed positions. Before loading the cassette 109 with the photo film strip 111, the drive unit shifts the opener shaft 118 to the engaged position with the key 116, and rotates the shutter plate 114 to the open position by way of the motor. After loading the cassette 109 with the photo film strip 111, the drive unit rotates the shutter plate 114 to the closed position by way of the motor, and shifts the opener shaft 118 away from the key 116 to the retracted position.

The retainer mechanism 170 retains the trailer 124 of the photo film strip 111 to the spool 112 of the cassette 109, and includes the insert plate 177, two capturing claws 178, and a rotating mechanism. The insert plate 177 inserts the trailer 124 into the spool 112. The capturing claws 178 are disposed on a distal edge of the insert plate 177. The rotating mechanism rotates the insert plate 177.

Figure 27:
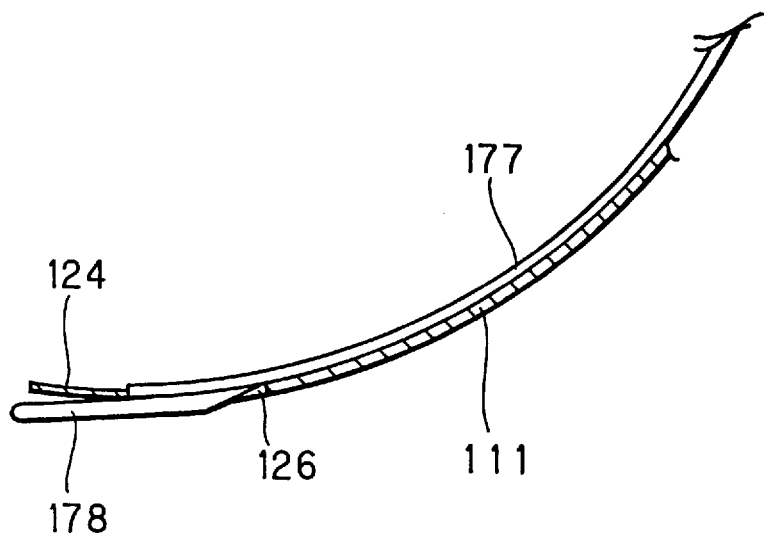
FIG. 27 is a side elevation illustrating an insert plate.
Figure 28:
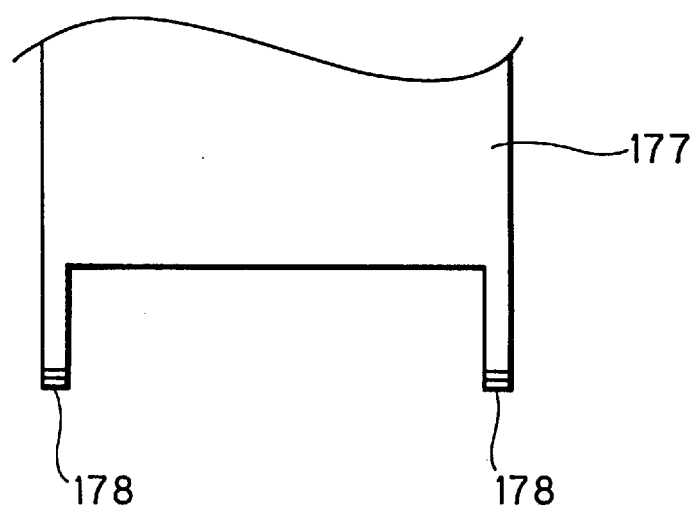
FIG. 28 is a front elevation illustrating the insert plate.

The insert plate 177 in FIGS. 27 and 28 is curved in arcuate fashion, is a thin metallic plate having flexibility, and has the capturing claws 178 formed integrally with its distal edge. The metallic plate for the insert plate 177 is preferably spring steel plate for a stainless spring, and desirably tempered.

The insert plate 177 is rotated by the rotating mechanism between the standby position and an inserting position. The capturing claws 178 in the standby position stand by above the support roller 173. The capturing claws 178 in the inserting position are entered into the slot 120 inside the cassette 109 after passage through the passageway 119. A rotary shaft 179 of the insert plate 177 is disposed equidistantly with the center of the spool 112, the passageway 119, and the capturing claws 178 in the standby position. When the insert plate 177 is rotated in the clockwise direction from the standby position in FIG. 25, the capturing claws 178 are passed through the passageway 119 and into the slot 120.

The capturing claws 178 become engaged with the holes 126 in the trailer 124 immediately after the start of rotating the insert plate 177, to capture the trailer 124. The capturing claws 178 have a length to be flush with, or projected from, a distal edge of the trailer 124 when capturing the trailer 124, for purpose of preventing the trailer 124 from being damaged by contact with the spool 112 while the insert plate 177 is in the inserting position.

Figure 29:
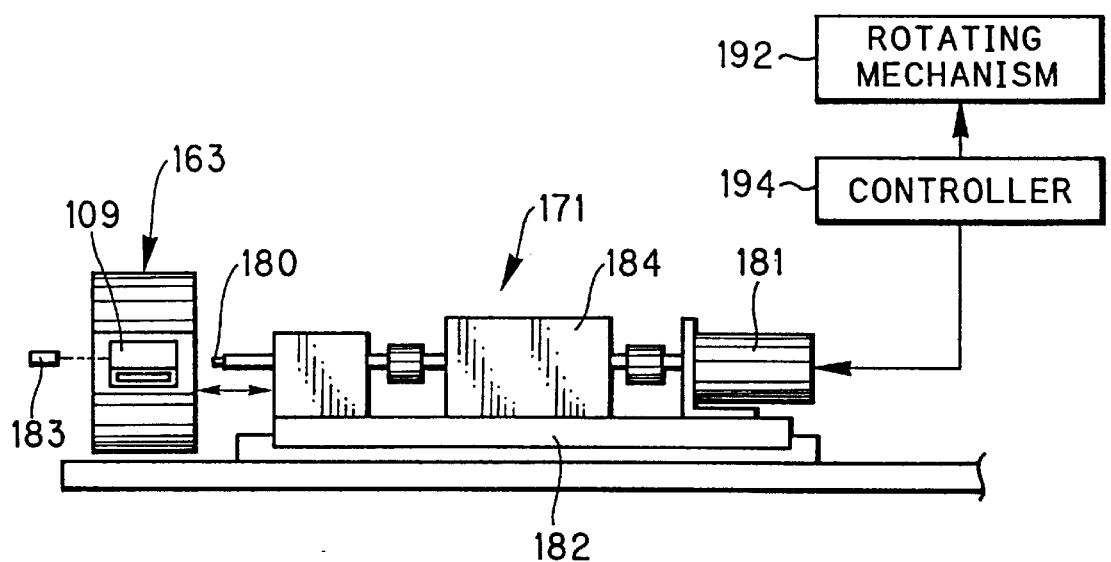
FIG. 29 is an explanatory view schematically illustrating a drive mechanism for a fork.

The spool drive mechanism 171 includes a fork 180 engaged with the key 113 of the spool 112, and a drive unit for driving the fork 180. The drive unit includes a shifting mechanism and a motor 181. The shifting mechanism shifts the fork 180 between a retracted position and an engaged position of engagement with the key 113. The motor 181 rotates the fork 180 to rotate the spool 112. As illustrated in FIG. 29, the fork 180 and the motor 181 are mounted on a slide frame 182. When the cassette holder 164 or 165 is positioned in the loading position, the shifting mechanism slides the slide frame 182 from the retracted position to the engaged position.

There is disposed a photo sensor 83 opposite to the fork 180 relative to the rotary barrel 163. The photo sensor 183 detects the notch 113a at the key 113, so as to check whether the spool 112 has a predetermined rotational position. Although not depicted in the drawings, an opposite end of the spool 112 also, has the key 113 and the notch 113a. The predetermined position for the spool 112 is such that an entrance of the slot 120 for the trailer 124 is directed along a rotational locus of the insert plate 177, in view of facilitating insertion of the capturing claws 178 into the slot 120 when the insert plate 177 has the inserting position.

A torque meter 184 is connected between the fork 180 and the motor 181, and measures torque required for rotating the spool 112. To be precise, the spool 112, after loading the cassette 109 with the cassette 109, is rotated in the unwinding direction to advance a small portion of the leader 123 to the outside of the cassette 109. During the unwinding, the torque applied to the spool 112 to advance the leader 123 is measured. Then the spool 112 in turn is rotated in the winding direction to re-contain the leader 123 in the cassette 109. In the winding rotation, the torque for the spool 112 is measured. Information of the torque as measured is transmitted to the supply/exit 142a–142c. If the torque is evaluated as a failure, the cassette 109 is exited to a receptacle for defective cassettes. Note that the termination of winding the photo film strip 111 is determined by way of the sensor 176.

The standby position of the support roller 173 is determined as illustrated in FIG. 25. If the support roller 173 were kept in the standby position, it would be probable that the photo film strip 111 at the start of the winding would be scratched by contact on the passageway 119. The support roller 173 is moved to such a start position that the photo film strip 111 is prevented from contacting the passageway 119, after the retention between the trailer 124 and the spool 112 and before the start of the winding of the photo film strip 111. The start position of the support roller 173 is determined as lower than the standby position and level with or slightly higher than the passageway 119.

In the course of winding of the photo film strip 111 on to the spool 112, the diameter of the roll of the photo film strip 111 increases around the spool 112. The position of the photo film strip 111 passed through the passageway 119 is thus gradually changed. The photo film strip 111 thus could be frictionally contacted on a lower wall of the passageway 119. The support roller 173 is shifted to change its height in accordance with a diameter of the photo film strip 111 and the support roller 173 is moved to an end position slightly before the end of the winding of the photo film strip 111, to prevent the photo film strip 111 from contacting the passageway 119. The end position is higher than the passageway 119.

To shift the support roller 173 from the start position to the end position, a cam plate 186 is used. The cam plate 186 is rotated about a shaft 186a by a rotating mechanism 192 under control of a controller 194, and is rotated in response to a start of the spool drive mechanism 171. A cam follower is driven by the cam plate 186 and rotated about a shaft 173a, to rotate the support roller 173 toward the end position.

The photo film strip 111 is curled by changes of temperature and humidity. The photo film strip 111 is typically curled like an "archway", namely in the width direction with the center projected convexly. The trailer 124 is supported only by the support roller 173 upward, and remains free with the arched curl without being straightened. If the insert plate 177 should be rotated with the trailer 124 curled, it would be likely that the capturing claws 178 might not be engaged with the holes 126. To straighten the arched curl of the trailer 124, the insert tension roller set 175 nips the trailer 124 while the retainer mechanism 170 is driven. The insert tension roller set 175 provides the photo film strip 111 with tension while the trailer 124 is safely inserted by actuation of the retainer mechanism 170.

The tension for the photo film strip 111 depends on brake force at a drive shaft of the insert tension roller set 175, and is preferably 20 to 200 grams. This makes it possible to capture the trailer 124 reliably, and to insert the trailer 124 with the insert plate 177 easily. Thus, the trailer 124 will not be stopped by any portion of the passageway 119. When the trailer 124 is retained on the spool 112, a solenoid 188 is actuated to retract the driven roller 175b away from the drive roller 175a and upward about a shaft 189. The insert tension roller set 175 is released from nipping the trailer 124.

A standby position of the back tension roller 174 is determined as a point which is located within the insert plate 177 and retracted from the rotational locus of the insert plate 177. The back tension roller 174 is set in the standby position by actuation of a solenoid 190. After the trailer 124 is retained on the spool 112, the solenoid 190 is stopped from actuation. The back tension roller 174 is rotated about a shaft 174a to a nipping position where the photo film strip 111 is nipped between it and the support roller 173. The photo film strip 111 can be loaded while the photo film strip 111 is tightly wound on the spool 112 with the photo film strip 111 nipped between the back tension roller 174 and the support roller 173.

Operation of assembling the photo film cassette 110 in the above constructed system is described now. As illustrated in FIG. 15, the cassette 109 is assembled in the bright room. Parts of the cassette 109 are assembled easily because assembly can be accomplished in the bright room. The shell halves 107 and 108 are firmly welded together by means of ultrasonic welding. The sticker 106 having the ID code 127 is attached to the cassette 109, which is transported into any of the supply/exit sections 142a–142c.

The cassette 109 is supplied by the supply/exit sections 142a–142c respectively to the transfer sections 143a–143c, where the cassette holder 164 of the rotary barrel 163 supports the cassette 109. The ID code 127 is read by sensors 166a–166c from the cassette 109. Information of the ID code 127 as read is sent to the preexposure device 138, in a serial manner in the order of the sensors 166a, 166b and 166c.

When the loader apparatuses 145a–145c are standing by for being driven, the continuous photo film 132 is drawn out of the reel 133. The continuous photo film 132 is provided with the perforations 129 by the perforator section 134, passed through the cutting section 135 and to the delivery section 140.

The delivery section 140 directs the trailer 124 of the photo film strip 111 to one of the radial paths 148a–148c, e.g. the radial path 148a, so that the ID code of the cassette 109 in the loader section 141a coincides with data of the ID code to be recorded on the photo film strip 111 in preexposure. The intermittent feeding roller 136 of the cutting section 135 transports the photo film strip 111 as far as the regular length, while the preexposure device 138 records the ID code according to the data sent from the sensor 166a. After the transportation of the regular length., the photo film strip 111 is separated by cutting operation. The nipping roller sets 153 of the radial path 148a are driven to transport the photo film strip 111 to the loader section 141a.

The transfer section 143a rotates the rotary barrel 163 simultaneously with the regular feeding of the intermittent feeding roller 136, to rotate the cassette 109 with the cassette holder 164 from the supply/exit position to the loading position. As illustrated in FIG. 30, the opener mechanism 172 and the spool drive mechanism 171 are actuated. The opener shaft 118 rotationally displaces the shutter plate 114 to the open position. The opener mechanism 172 rotationally sets the spool 112 in the predetermined position.

When the trailer 124 is detected by the sensor 176, the photo film strip 111 is stopped from being transported. The photo film strip 111 as stopped is stocked within the length of the radial path 148a and the horizontal path 149a inside the dark compartment 147.

In the initial position of the loader,section 141a, the trailer 124 is nipped by the insert tension roller set 175, as illustrated in FIG. 25. The nipping roller sets 153 have a free state. The support roller 173 has the standby position. The back tension roller 174 has the retracted position.

Figure 31:
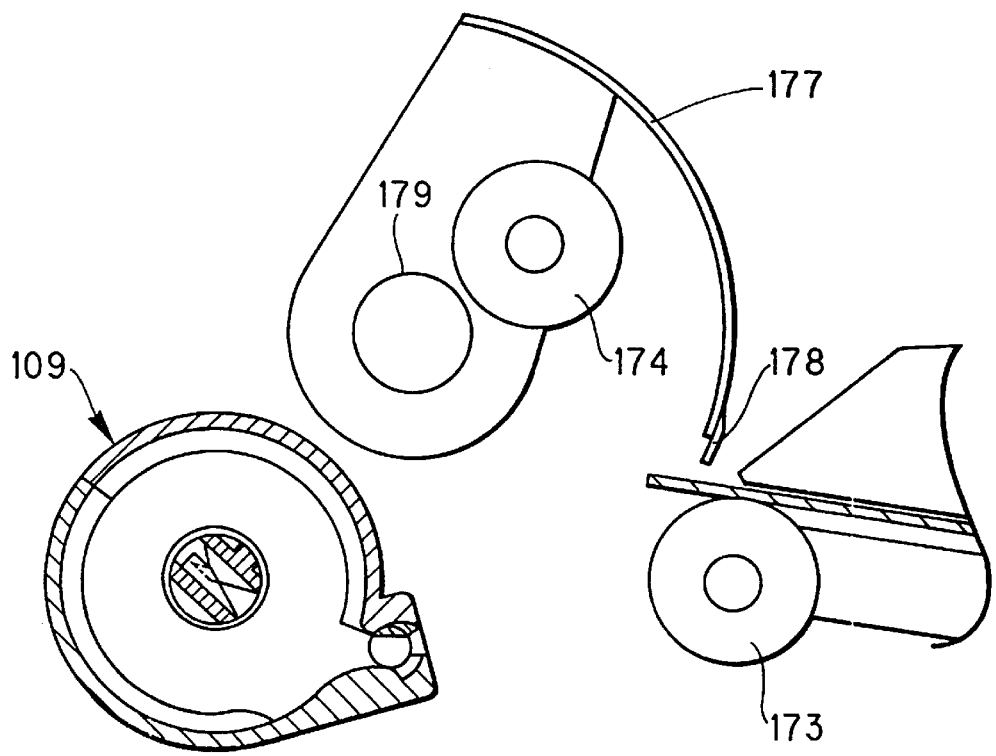
FIG. 31 is an explanatory view illustrating detection of a trailer of the photo film strip.

Upon detection of the trailer 124, the retainer mechanism 170 is actuated. As illustrated in FIG. 31, the insert plate 177 is rotated about the shaft 179 in the clockwise direction. Immediately the capturing claws 178 are engaged with the holes 126 in the trailer 124. In further rotation of the insert plate 177, the capturing claws 178 swing with the trailer 124 captured thereon. The photo film strip 111 follows the locus of the insert plate 177 from the support roller 173.

Figure 32:
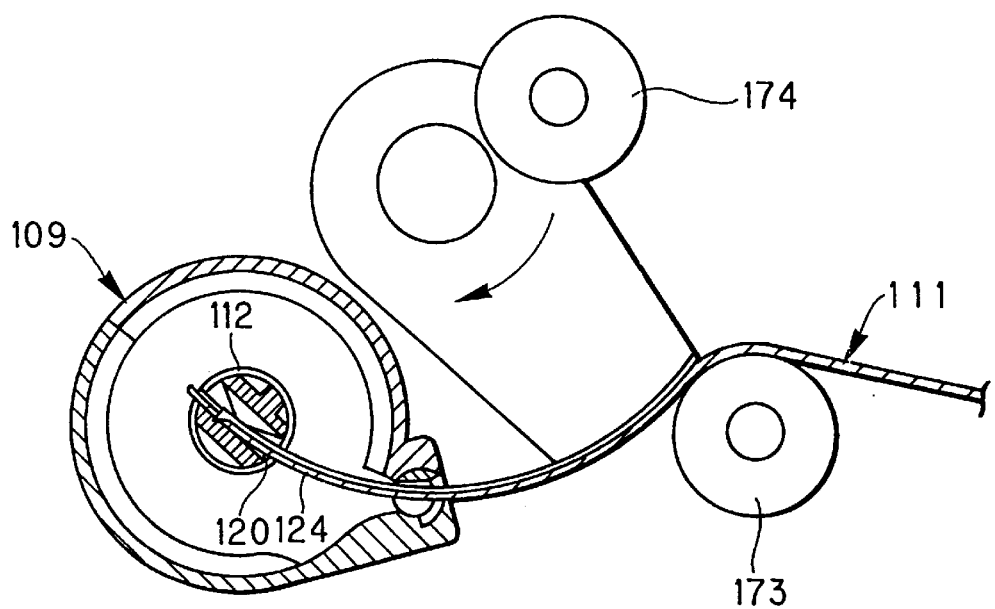
FIG. 32 is an explanatory view illustrating an inserting position of retaining claws.
Figure 33:
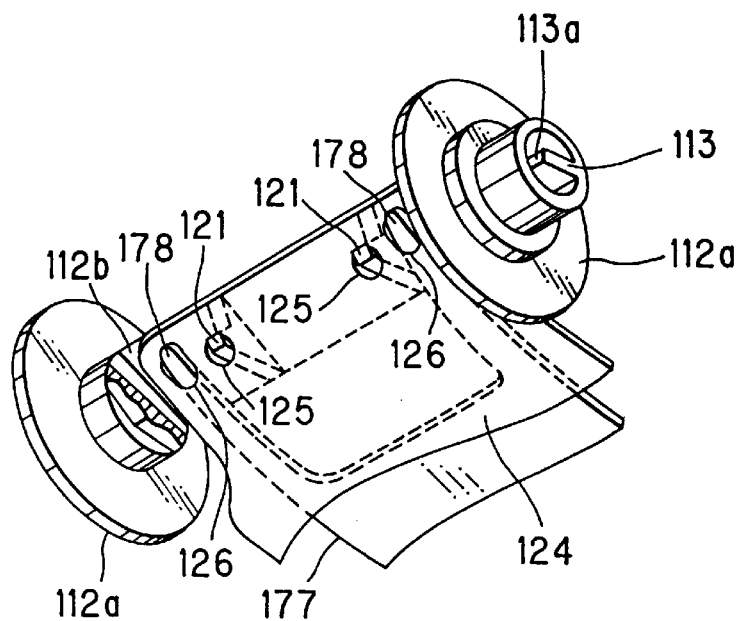
FIG. 33 is an explanatory view illustrating insertion of the retaining claws into the spool.

The capturing claws 178 pass through the passageway 119 with the trailer 124 captured, and into the cassette 109. The capturing claws 178 enter the slot 120 in the core 112b, to have the state of FIG. 32. The trailer 124, as in FIG. 33, is passed between the hooks 121 and the ridges 122 inside the slot 120, to insert the hooks 121 into the retaining holes 125. Even though the capturing claws 178 are rubbed on the inside of the slot 120, the flexibility of the capturing claws 178 enables them to be smoothly inserted into the slot 120 to the full depth of the slot 120. Note that the lower half of the core 112b is eliminated from FIG. 33.

The trailer 124 is retained on the core 112b of the spool 112. Then the insert plate 177 is rotated back to the standby position, to retract the capturing claws 178 away from the cassette 109. The hooks 121 are so shaped as to hinder the trailer 124 from moving in the removing direction. The retaining holes 125, once engaged with the hooks 121, are never disengaged from the same even while the insert plate 177 is being pulled away from the slot 120.

After the insert plate 177 is rotated to the standby position, the cam plate 186 is rotated at an amount of a predetermined angle as illustrated in FIG. 34. The support roller 173 is moved to the start position. As illustrated in FIG. 35, the photo film strip 111 comes nearest to the lower face of the passageway 119. A lower guide plate 195 also moves with the movement of the support roller 173. The lower guide plate 195 is one of the guide plates, is disposed between the support roller 173 and the drive roller 175a, and supports the bottom of the photo film strip 111. For the start of the winding, the lowest point around the core of the spool 112 and the position of the passageway 119 are substantially level with the highest point around the support roller 173. The photo film strip 111 is horizontally transported.

Figure 36:
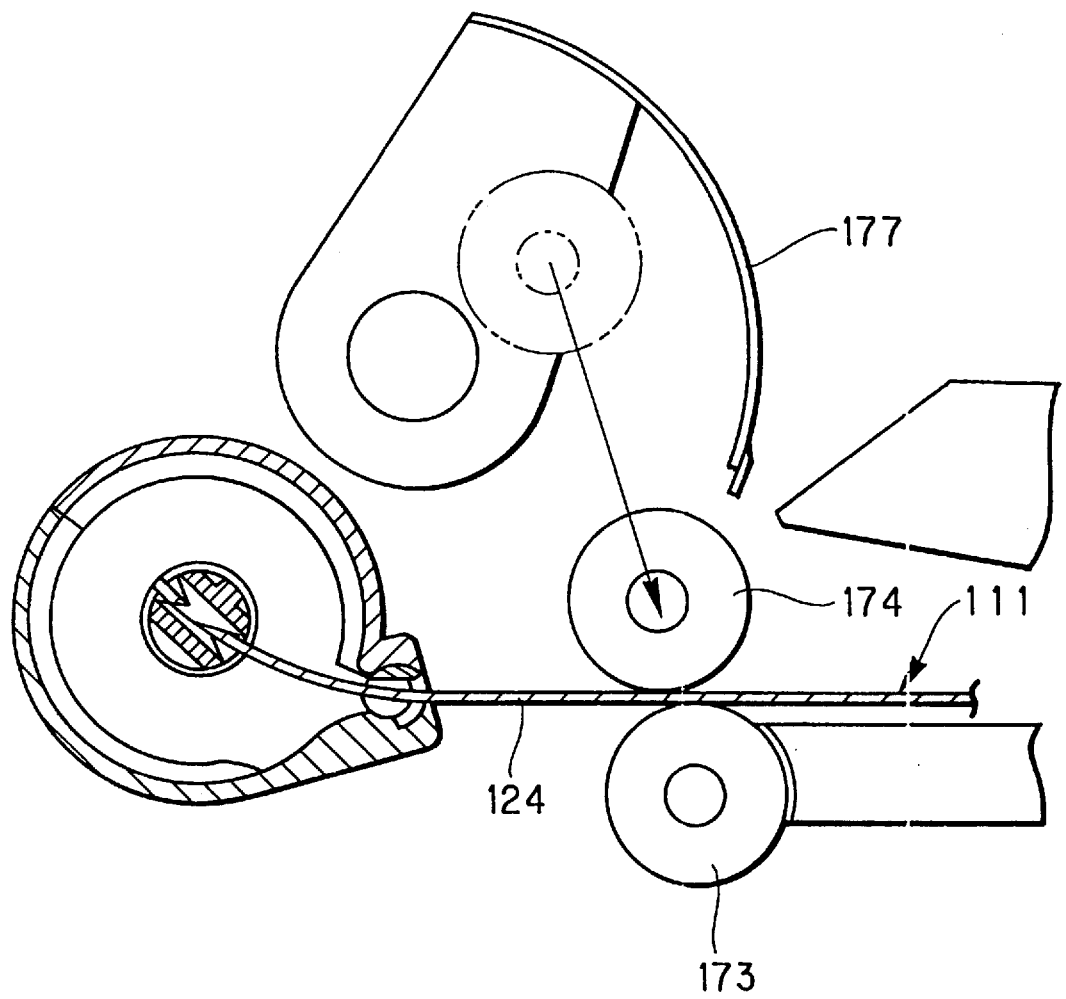
FIG. 36 is an explanatory view illustrating a nipping position of a back tension roller.

As illustrated in FIG. 36, the back tension roller 174 is moved to the nipping position. The photo film strip 111 is nipped between the back tension roller 174 and the support roller 173. The driven roller 175b of the insert tension roller set 175 is moved to the retracted position, namely away from the drive roller 175a, to release the photo film strip 111 from being nipped.

Figure 37:
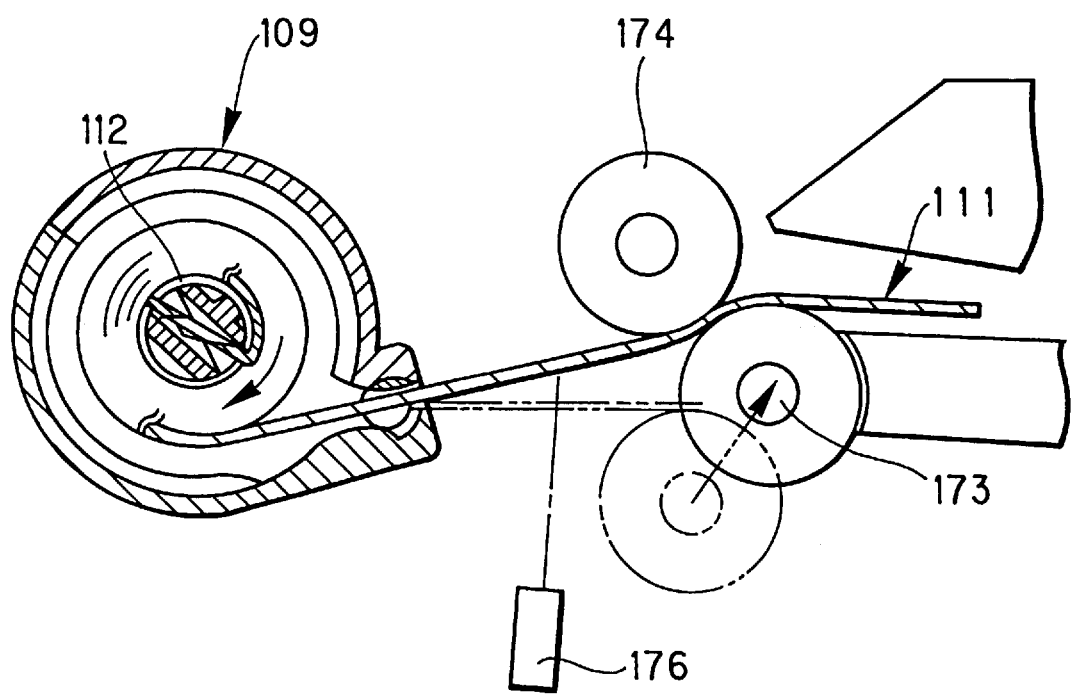
FIG. 37 is an explanatory view illustrating a shift of a support roller in accordance with a roll diameter.

After the insert tension roller set 175 is released from nipping, the fork 180 is rotated by the motor 181, to rotate the spool 112 in the winding direction. The photo film strip 111 is nipped between the back tension roller 174 and the support roller 173, and thus is wound tightly on the spool 112. In synchronism with the fork 180, the cam plate 186 is rotated in the clockwise direction in FIG. 34. As illustrated in FIG. 37, the support roller 173 is being moved from the start position to the end position according as the diameter of the photo film strip 111 is changed around the spool 112. Therefore it is possible to load the photo film strip 111 without rubbing it on the passageway 119.

When the sensor 176 detects termination of winding the photo film strip 111, the fork 180 is stopped from rotating. Then the torque for rotation is measured. The torque meter 184 is connected to the fork 180, and monitors the torque for winding the photo film strip 111. It is possible to check changes in tension applied to the photo film strip 111, and to avoid damage due to unwanted high tension.

To measure the torque, the fork 180 is rotated to advance a small portion of the leader 123 to the outside of the cassette 109. Then the leader 123 is wound back into the cassette 109. In the meantime the torque meter 184 measures the advancing torque and the winding torque. Information of results of the measurement is transmitted to the supply/exit section 142a.

After the torque is measured, the opener mechanism 172 rotates the opener shaft 118, to move the shutter plate 114 rotationally to the closed position. Ambient light is prevented from entering the photo film cassette 110. Then the transfer section 143a causes the rotary barrel 163 to make half a rotation. Finally the ID code 127 outside the cassette 109 is read again, and is compared with data of the ID code prerecorded with the photo film strip 111. It is thus possible to confirm identity of the ID code between the photo film strip 111 and the cassette 109.

After the comparison of the data of the ID code, the photo film cassette 110 is exited to the supply/exit section 142a. Similar operations are repeated.

Figure 38:
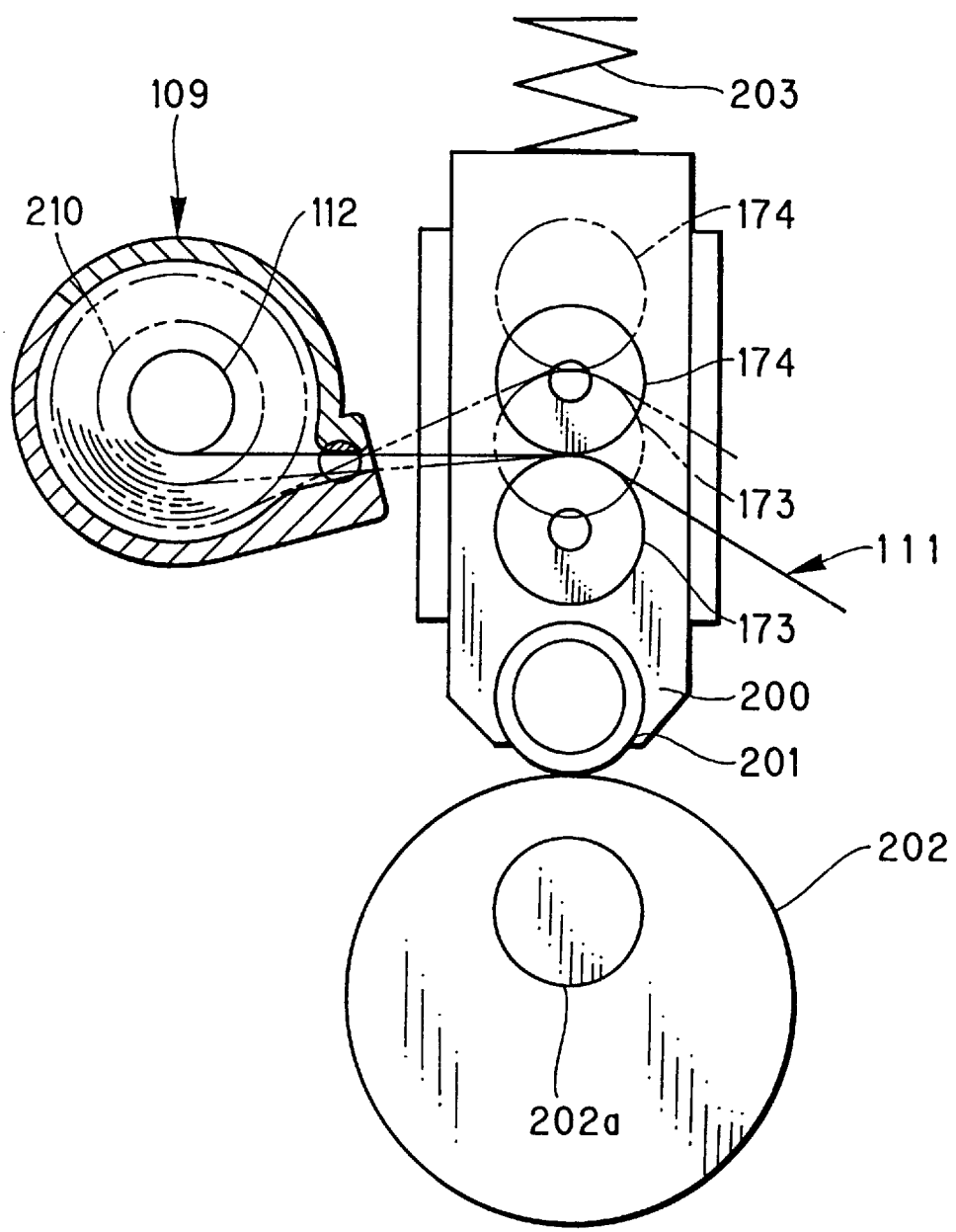
FIG. 38 is an explanatory view illustrating another preferred mechanism for shifting a support roller in accordance with a roll diameter.

FIG. 38 illustrates another preferred embodiment in which the support roller 173 is shifted lineraly, not rotationally. Elements similar to those of the former embodiments are designated with identical reference numerals. A slide plate 200 is movable vertically by way of a guide member, and is biased by a spring 203 in a direction for pressing a cam follower 201 against a cam plate 202. The cam plate 202 rotates in a clockwise direction about an eccentric shaft 202a. The cam plate 202 is so shaped that it shifts the support roller 173 from the start position to the end position in the winding while the cam plate 202 makes half a rotation. The support roller 173 is shiftable together with the back tension roller 174 toward the end position.

The length of the photo film strip 111 is different according to maximum number of available frames on it. The diameter of the roll of the photo film strip 111 around a spool is thus different. The ridges 115 against looseness and formed for one fixed diameter of the roll not suitable for another roll of a different diameter inside the cassette 109. It is necessary to change height of the ridges 115 or the diameter of the spool 112 according to the length of the photo film strip 111.

Unlike changes in the ridges 115, there is a problem in the changes in the diameter of the spool 112. Specifically it would be likely that the photo film strip 111 at the start of the winding might be contacted on the passageway 119 if the start position of the support roller 173 were unchanged even with a changed diameter of the spool 112. A spool 210, if suitable for a photo film strip having a smaller length, has a greater diameter. The cam plate 202 is previously rotated by a small amount, so as to heighten the start position of the support roller 173 over the position depicted in FIG. 38 with the solid lines. It is possible to prevent the photo film strip 111 from contacting the passageway 119 at the start of the winding, because the start position of the support roller 173 is varied with the changes in the diameter of the spool 112. Note that it is unnecessary to change the end position of the support roller 173, because the spool 112 is so shaped that the maximum diameter of the roll of the photo film strip 111 is constant irrespective of the length of the photo film strip 111.

Figure 39:
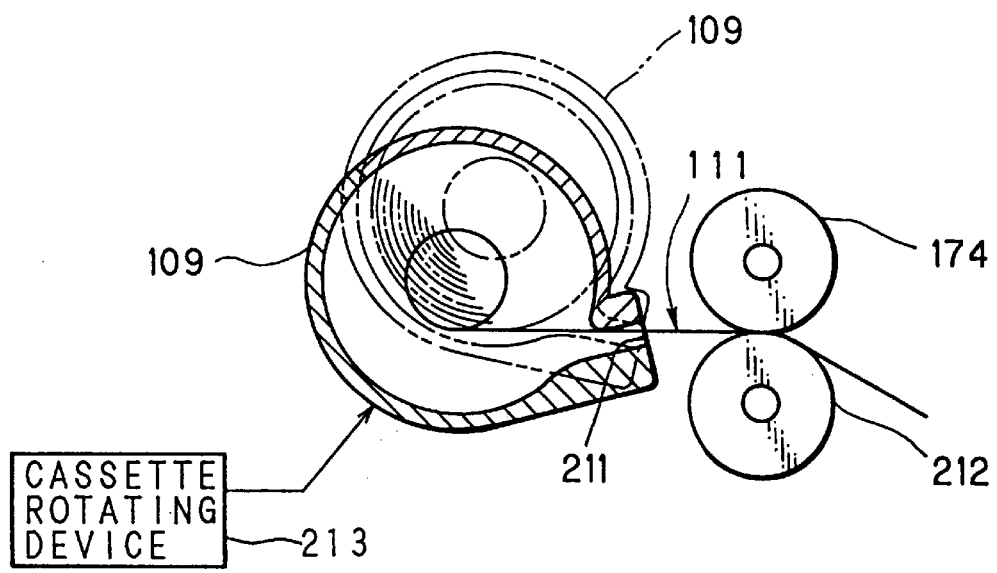
FIG. 39 is an explanatory view illustrating a preferred embodiment in which a cassette is shifted in accordance with a roll diameter.

In the embodiment as illustrated in FIG. 37, the support roller 173 is moved with changes of the diameter of the roll. Alternatively the cassette 109 can be moved for the same purpose, as illustrated in FIG. 39. In view of this, the cassette holders 164 and 165 are provided with a mechanism 213 for rotating the cassette 109. Elements similar to those of the former embodiments are designated with identical reference numerals. The cassette 109 is rotated about a central point 211 of the tongue portions 107a and 108a in the counter-clockwise direction, so as to keep the photo film strip 111 from contacting the passageway 119 during the winding of the photo film strip 111. Reference numeral 212 designates a stationary roller for supporting the trailer of the photo film strip. Note that the spool 112 is depicted in FIGS. 38 and 39 in simplified fashion to avoid complexity in illustration. The shutter plate 114 is eliminated from FIG. 39.

As described above, the photo film cassette 110 itself is assembled in a bright room. The only steps in a dark room are the retention of the trailer 124 to the spool 112, and the winding of the photo film strip. Thus, photo film cassettes can be manufactured at the high efficiency of 45 to 75 products per minutes.

It is possible in embodying the present invention to adopt constructions in the following modes:

(1) A photo film loader apparatus, wherein: the insert plate 177 is arcuate; the photo film strip 111 further includes an engaging hole 126 formed in the trailer 124; further comprising plural capturing claws 178, disposed at a distal end of the insert plate, engaged with the engaging hole in the trailer, for capturing the trailer, the plural capturing claws including distal ends having a length to be flush with, or projected from, the trailer of the photo film strip when capturing the trailer.

(2) A photo film loader apparatus further comprising a tension roller 175, disposed in the dark compartment 147, contacted on the photo film strip 111 upstream from the spool rotating device 171, for providing the photo film strip with tension in capturing of the trailer 124 at the insert plate 177.

In the mode (1), it is possible to prevent the trailer from being bent when contacted on the spool. Should a difficulty occur in course of retention of the trailer, an operation for trailer retention can be restarted to enable the trailer to be engaged with the spool with reliability.

In the mode (2), it is possible to eliminate the curl in the trailer of the photo film strip. The trailer can be captured with the capturing claws without fail.

Although the present invention has been fully described by way of the preferred embodiments thereof with reference to the accompanying drawings, various changes and modifications will be apparent to those having skill in this field without departing from the scope of the present invention.

What is claimed is:

1. A photo film loader apparatus for loading a cassette with a photo film strip, said cassette having a photo film passageway through which a leader of said photo film strip is drawn out of a cassette shell, and a spool on which a trailer of said photo film strip is retained, said loader apparatus comprising:

a light-tight dark compartment;

a rotary barrel device disposed in rotatable fashion and partially fitted in an opening formed in a downstream wall of said dark compartment;

a plurality of cassette holders, disposed on said barrel device and in respective positions opposite with reference to a rotational axis of said barrel device, for holding said cassette removably, said barrel device being rotated to move said cassette holders into and out of said dark compartment;

a cassette supply device, disposed outside said dark compartment, for supplying said cassette to one of said cassette holders located outside said dark compartment;

a photo film retaining device, disposed inside said dark compartment, for accessing said cassette at one of said cassette holders located inside said dark compartment, in order to pass said trailer of said photo film strip into said photo film passageway in said cassette, and to retain said trailer on said spool; and a spool rotating device, disposed in said dark compartment, for rotating said spool of said cassette, said spool rotating device driven for winding said photo film strip on said spool with said trailer retained, to include said photo film strip into said cassette, said cassette being removable from said cassette holder when said cassette holder is moved out of said dark compartment upon rotation of said barrel device.

2. A photo film loader apparatus as defined in claim 1, further comprising a cutter device, disposed upstream from said barrel device, for previously cutting a continuous photo film into said photo film strip of a regular length.

3. A photo film loader apparatus as defined in claim 1, further comprising a light-shielding structure for preventing ambient light from entering said dark compartment through said opening downstream therefrom, a part of said light-shielding structure provided on said barrel device.

4. A photo film loader apparatus as defined in claim 1, wherein said photo film retaining device includes an insert plate for capturing said trailer of said photo film strip cut at a regular length; and said insert plate is drawn out of said cassette after said insert plate passes said trailer through said photo film passageway and retains said trailer on said spool.

5. A photo film loader apparatus as defined in claim 4, wherein:

said insert plate is arcuate;

said photo film strip further includes an engaging hole formed in said trailer;

further comprising a plurality of capturing claws, disposed at a distal end of said insert plate, engaged with said engaging hole in said trailer, for capturing said trailer, said plural capturing claws including distal ends having a length to be flush with, or projected from, said trailer of said photo film strip when capturing said trailer.

6. A photo film loader apparatus as defined in claim 5, further comprising a tension roller, disposed in said dark compartment, contacted on said photo film strip upstream from said spool rotating device, for providing said photo film strip with tension in capturing of said trailer at said insert plate.

7. A photo film loader apparatus as defined in claim 1, further comprising:

a first linear path device through which a first path is formed, and which is supplied with said photo film strip;

a second linear path device through which a second path is formed, and which is connected downstream of said first path device in inclination at a sloping connecting portion, for guiding said photo film strip from said first path device toward said barrel device; and a nipping roller, disposed at said sloping connecting portion, for conveying said photo film strip along said first and second path devices to said barrel device.

8. A photo film loader apparatus as defined in claim 1, further comprising:

a shiftable roller, disposed in said dark compartment in rotatable and shiftable fashion, and contacted on said photo film strip directed to said photo film passageway of said cassette held in one of said cassette holders; and a shifting device which supports said shiftable roller, and is driven with said spool rotating device, for shifting said shiftable roller while said photo film strip is wound around said spool, to change a course of said photo film strip in accordance with a diameter of a roll of said photo film strip around said spool, for avoiding rubbing said photo film strip on said cassette shell.

9. A photo film loader apparatus as defined in claim 8, wherein said shifting device includes:

a rotary cam plate which has a cam face thereabout, and which is disposed rotatably;

a rotating mechanism for rotating said rotary cam plate in synchronism with said spool rotating device; and a movable linkage mechanism which supports said shiftable roller, and is contacted on said cam face, for shifting said shiftable roller in response to rotation of said cam plate, said shiftable roller shifted in one direction and at a predetermined amount according to an increase in said diameter of said roll.

10. A photo film loader apparatus as defined in claim 9, wherein said movable linkage mechanism is a swingable lever, of which a first end is contacted on said cam plate, and a second end supports said shiftable roller.

11. A photo film loader apparatus as defined in claim 9, wherein said movable linkage mechanism is a plate slidable toward, or away from, a rotational axis of said cam plate.

12. A photo film loader apparatus as defined in claim 1, further comprising a cassette rotating device, disposed in said dark compartment, and contacted on said cassette upstream from said spool rotating device, for rotating said cassette, said cassette rotating device driven with said spool rotating device, said cassette rotated while said photo film strip is wound on said spool, said cassette rotating device changing relative orientation of said photo film strip to said cassette in accordance with said diameter of said roll of said photo film strip around said spool, for avoiding rubbing said photo film strip on said cassette shell.

13. A photo film loader apparatus as defined in claim 1, wherein said cassette has a structure for advancing said leader of said photo film strip to an outside of said photo film passageway when said spool is rotated in a direction of unwinding said photo film strip;

after said photo film strip is wound in said cassette, said spool rotating device rotates said spool in said unwinding direction to protrude a small portion of said leader from said photo film passageway, and subsequently rotates back said spool in a winding direction to include said leader in said cassette;

further comprising a measuring device for measuring torque applied by said spool rotating device to said spool for rotation, said torque measured while said spool rotating device protrudes said leader from said photo film passageway, and while said spool rotating device subsequently includes said leader in said cassette.

14. A photo film loader apparatus as defined in claim 1, wherein said cassette further includes an identifying information portion disposed on an outside of said cassette shell and formed to represent identifying information of said cassette shell;

further comprising:
an information reader for reading said identifying information of said cassette held in said cassette holder; and an information recorder, connected to said information reader, for imprinting an information image of a latent image form on said photo film strip in accordance with said identifying information from said information reader, wherein said spool rotating device winds said photo film strip into said cassette in said cassette holder after said information recorder imprints said information image.

15. A photo film loader apparatus as defined in claim 14, wherein said information reader reads second identifying information of a second cassette held in said cassette holder after a start of imprinting said information image at said information recorder.

16. A photo film loader apparatus as defined in claim 1, wherein there are a plurality of said barrel device;

further comprising:
a supply path through which said photo film strip is transported one after another;

a plurality of transport paths for guiding said photo film strip respectively to said plurality of said barrel device, said transport paths having entry slots opened radially;

a rotary disk disposed between said supply path and said transport paths and in rotatable fashion about a central axis, said central axis being perpendicular to a longitudinal direction of said photo film strip and parallel to a plane of said photo film strip;

a stationary guide plate disposed between said supply path and said central axis of said rotary disk, a first path formed in said guide plate at a size associated with a thickness of said photo film strip, for guiding said photo film strip from said supply path toward said central axis of said rotary disk;

a delivery guide device, mounted on said rotary disk, positioned between said central axis of said rotary disk and said transport paths, a second path formed in said delivery guide device at a size associated with a thickness of said photo film strip, for receiving said photo film strip from said stationary guide plate in a vicinity of said central axis, to guide said photo film strip in a radial direction of said rotary disk; and a motor for rotating said rotary disk, said rotary disk stopped sequentially to direct an exit slot of said delivery guide device toward said entry slots of said transport paths, said photo film strip transported through said delivery guide device into a selected one of said transport paths.

17. A photo film loader apparatus as defined in claim 16, further comprising:

a pair of guide roller disposed in a vicinity of said central axis of said rotary disk, and disposed on opposite sides of said photo film strip in a thickness direction thereof at an interval greater than said thickness of said photo film strip from each other; and a rotating mechanism for rotating said pair of said guide rollers in synchronism with speed at which said photo film strip is transported from said supply path, said photo film strip contacted on either of said guide rollers while transported from said supply path, and guided into an entry slot of said delivery guide device.

18. A photo film loader apparatus as defined in claim 17, further comprising flanges formed on respective ends of said pair of said guide rollers, a periphery of said flanges contacted on edges of said photo film strip and outside an effective frame area of said photo film strip.

19. A photo film loader apparatus as defined in claim 18, wherein said delivery guide device includes at least a pair of guide plates;

further comprising support portions, projected respectively from said guide plates and toward one another, for supporting said photo film strip along said edges thereof;

there being formed a greater interval between said support portions than said thickness of said photo film strip, irrespectively of a rotational position of said delivery guide device; and there being formed a greater interval between said flanges of said guide rollers than said thickness of said photo film strip, irrespectively of said rotational position of said delivery guide device.

20. An apparatus for transporting a photo film strip having a predetermined length, comprising:
   a first linear path device through which a first path is formed, and which is supplied with said photo film strip;
   a second linear path device through which a second path is formed, and which is connected downstream of said first path device in inclination at a sloping connecting portion, for guiding said photo film strip from said first path device; and
   a nipping roller, disposed at said sloping connecting portion, for conveying said photo film strip along said first and second path devices.

21. A system for assembling a photo film cassette, wherein said cassette has a photo film passageway through which a leader of a photo film strip is drawn out of a cassette shell, and a spool on which a trailer of said photo film strip is retained, said cassette assembling system including a plurality of photo film transport apparatuses arranged radially, and a plurality of photo film loader apparatuses respectively connected thereto;
   each of said transport apparatuses comprising:
      a) a first linear path device through which a first path is formed, and which is supplied with said photo film strip;
      b) a second linear path device through which a second path is formed, and which is connected downstream of said first path device at a connecting portion, for guiding said photo film strip from said first path device; and
      c) a nipping roller, disposed at said connecting portion, for conveying said photo film strip along said first and second path devices;
   each of said loader apparatuses comprising:
      A) a light-tight dark compartment;
      B) a rotary barrel device disposed in rotatable fashion and partially fitted in an opening formed in a downstream wall of said dark compartment, said photo film strip transported to said barrel device from an associated one of said transport apparatuses;
      C) a plurality of cassette holders, disposed on said barrel device and in respective positions opposite with reference to a rotational axis of said barrel device, for holding said cassette removably, said barrel device rotated to move said cassette holders into and out of said dark compartment;
      D) a cassette supply device, disposed outside said dark compartment, for supplying said cassette to one of said cassette holders located outside said dark compartment;
      E) a photo film retaining device, disposed inside said dark compartment, for accessing said cassette at one of said cassette holders located inside said dark compartment, in order to pass said trailer of said photo film strip into said photo film passageway in said cassette, and to retain said trailer on said spool; and
      F) a spool rotating device, disposed in said dark compartment, for rotating said spool of said cassette, said spool rotating device driven after said photo film retaining device finishes said retention, for winding said photo film strip on said spool with said trailer retained, to include said photo film strip into said cassette, said cassette being removable from said cassette holder when said cassette holder is moved out of said dark compartment upon rotation of said barrel device.

22. A photo film loader apparatus for loading a cassette with a photo film strip, said cassette having a photo film passageway through which a leader of said photo film strip is drawn out of a cassette shell, and a spool on which a trailer of said photo film strip is retained, said loader apparatus comprising:
   a cassette holder for holding said cassette with said trailer retained on said spool;
   a spool rotating device for rotating said spool in said cassette held in said cassette holder, to wind said photo film strip on said spool;
   a shiftable roller, disposed in rotatable and shiftable fashion, and contacted on said photo film strip directed to said photo film passageway of said cassette held in said cassette holder; and
   a shifting device which supports said shiftable roller, and is driven with said spool rotating device, for shifting said shiftable roller while said photo film strip is wound around said spool, to change a course of said photo film strip in accordance with a diameter of a roll of said photo film strip around said spool, for avoiding rubbing said photo film strip on said cassette shell.

23. A photo film loader apparatus for loading a cassette with a photo film strip, said cassette having a photo film passageway through which a leader of said photo film strip is drawn out of a cassette shell, and a spool on which a trailer of said photo film strip is retained, said loader apparatus comprising:
   a cassette holder for holding said cassette with said trailer retained on said spool;
   a spool rotating device for rotating said spool in said cassette held in said cassette holder, to wind said photo film strip on said spool; and
   a cassette rotating device, disposed at said cassette holder, and contacted on said cassette upstream from said spool rotating device, for rotating said cassette, said cassette rotating device driven with said spool rotating device, said cassette being rotated while said photo film strip is wound on said spool, said cassette rotating device changing relative orientation of said photo film strip to said cassette in accordance with a diameter of a roll of said photo film strip around said spool, for avoiding rubbing said photo film strip on said cassette shell.

24. A photo film loader apparatus for loading a cassette with a photo film strip, said cassette having a spool on which a trailer of said photo film strip is retained, wherein said cassette has a structure for advancing a leader of said photo film strip to an outside of a cassette shell when said spool is rotated in a direction of unwinding said photo film strip, said loader apparatus comprising:
   a cassette holder for holding said cassette with said trailer retained on said spool;
   a spool rotating device for rotating said spool in said cassette held in said cassette holder, to wind said photo film strip on said spool, wherein said spool rotating device, after said photo film strip is wound in said cassette, rotates said spool in said unwinding direction to protrude a small portion of said leader from said photo film passageway, and subsequently rotates back said spool in a winding direction to include said leader in said cassette; and a measuring device for measuring torque applied by said spool rotating device to said spool for rotation, said torque measured while said spool rotating device protrudes said leader from said photo film passageway, and while said spool rotating device subsequently includes said leader in said cassette.

25. An apparatus for assembling a photo film cassette, wherein said cassette has a spool with a photo film strip retained thereon, a cassette shell for containing a roll of said photo film strip, and an identifying information portion disposed on an outside of said cassette shell and formed to represent identifying information of said cassette shell, said assembling apparatus comprising:

- a cassette holder for holding said cassette with said trailer retained on said spool;
- an information reader for reading said identifying information of said cassette held in said cassette holder;
- an information recorder, connected to said information reader, for imprinting an information image of a latent image form on said photo film strip in accordance with said identifying information from said information reader; and
- a spool rotating device for rotating said spool in said cassette held in said cassette holder, to wind said photo film strip on said spool in said cassette in said cassette holder after said information recorder imprints said information image.

26. A cassette assembling apparatus as defined in claim 25, wherein said information reader reads second identifying information of a second cassette held in said cassette holder after a start of imprinting said information image at said information recorder.

27. An apparatus for delivering a photo film strip, comprising:

- a supply path through which said photo film strip is transported one after another;
- a plurality of transport paths for receiving said photo film strip supplied by said supply path, said transport paths having entry slots opened radially;
- a rotary disk disposed between said supply path and said transport paths and in rotatable fashion about a central axis, said central axis being perpendicular to a longitudinal direction of said photo film strip and parallel to a plane of said photo film strip;
- a stationary guide plate disposed between said supply path and said central axis of said rotary disk, a first path formed in said guide plate at a size associated with a thickness of said photo film strip, for guiding said photo film strip from said supply path toward said central axis of said rotary disk;
- a delivery guide device, mounted on said rotary disk, positioned between said central axis of said rotary disk and said transport paths, a second path formed in said delivery guide device at a size associated with a thickness of said photo film strip, for receiving said photo film strip from said stationary guide plate in a vicinity of said central axis, to guide said photo film strip in a radial direction of said rotary disk; and
- a motor for rotating said rotary disk, said rotary disk stopped sequentially to direct an exit slot of said delivery guide device toward said entry slots of said transport paths, said photo film strip transported through said delivery guide device into a selected one of said transport paths.

\* \* \* \* \*